(12) United States Patent
Reeb et al.

(10) Patent No.: US 6,600,723 B1
(45) Date of Patent: Jul. 29, 2003

(54) PROCESS FOR TESTING AND ENSURING THE AVAILABILITY OF A NETWORKED SYSTEM

(75) Inventors: Max Reeb, Boertlingen (DE); Juergen Minuth, Suessen (DE); Juergen Setzer, Illingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/155,397

(22) PCT Filed: Mar. 26, 1997

(86) PCT No.: PCT/EP97/01533
§ 371 (c)(1),
(2), (4) Date: Mar. 1, 1998

(87) PCT Pub. No.: WO97/36183
PCT Pub. Date: Oct. 2, 1997

(30) Foreign Application Priority Data

Mar. 26, 1996 (DE) .......................................... 196 11 944

(51) Int. Cl.[7] .................... G01R 31/08; H04L 12/28; H04L 12/50; H02H 3/24; G11C 29/00
(52) U.S. Cl. ................... 370/245; 370/364; 370/395.31; 361/90; 714/721
(58) Field of Search ................................. 701/1; 714/56, 714/721, 723; 370/402, 401, 364, 365, 362, 363, 451, 438, 440, 421, 422, 241, 242, 243, 244, 245, 246, 247, 248, 446, 257, 423; 361/90, 91.1, 92

(56) References Cited

U.S. PATENT DOCUMENTS

| | | | |
|---|---|---|---|
| 4,908,822 A | | 3/1990 | Wroblewski |
| 5,717,714 A | * | 2/1998 | Andersson et al. .......... 370/243 |
| 5,724,343 A | * | 3/1998 | Pain et al. ................... 370/242 |
| 5,774,817 A | * | 6/1998 | Takagi et al. .................. 701/1 |
| 5,784,547 A | * | 7/1998 | Dittmar et al. ................ 714/56 |
| 5,815,493 A | * | 9/1998 | Riley .......................... 370/242 |
| 5,903,565 A | * | 5/1999 | Neuhaus et al. ............. 370/402 |

FOREIGN PATENT DOCUMENTS

| | | |
|---|---|---|
| DE | 4212742 A1 | 10/1993 |
| EP | 0287992 A2 | 10/1988 |
| JP | 186934/1992 | 11/1990 |
| JP | 239296/1992 | 1/1991 |

* cited by examiner

Primary Examiner—Kwang Bin Yao
Assistant Examiner—Hanh Nguyen
(74) Attorney, Agent, or Firm—Crowell & Moring LLP

(57) ABSTRACT

A method for testing and safeguarding the availability of a networked system which is assigned to a system carrier, wherein a multiplicity of subscribers exchange data via a bus-type network which is comprised of one or more bus lines. Specific voltage levels are applied to the bus line or the lines by the appropriate subscribers. By virtue of this, as a minimum, at least individual subscribers transmit data. The bus line or the lines is/are monitored by the at least one receiving subscriber for an overshoot or undershoot of voltage levels. Due to this, the data is evaluated in at least one receiving subscriber with the aid of voltage levels. During operation of the system, signals present on the bus-type network are discriminated, tested or measured with respect to at least one signal criterion by individual subscribers under conditions defined in a network-wide manner for all subscribers. In each case, characteristic status data is generated for each signal criterion (with respect to each subscriber) and collected and arranged in at least one status map of the system. This status data characterizes both the current and at least one earlier status, with regard to the tested subscribers and with respect to the at least one criterion. At least one measure of the margin of error of the networked system with respect to the at least one criterion is obtained from the status data.

11 Claims, 10 Drawing Sheets

PROCESS FOR TESTING AND ENSURING THE AVAILABILITY OF A NETWORKED SYSTEM

BACKGROUND AND SUMMARY OF THE INVENTION

The invention relates to a method for testing and safeguarding the availability of a networked system. In particular, the method relates to safeguarding the availability of a networked system that is, inter alia, also connected with possible reference-earth potential displacements.

German patent document DE 42 12 742 A1 discloses a method for detecting errors in a data bus having two bus lines which are driven via output stages at least of one of the bus subscribers. Here, the possibility exists that the two output stages of a bus subscriber are driven simultaneously upon commissioning of the data bus. In this case, the ability to determine the level of the potential of a bus line and to generate an error report by the bus subscriber given a lack of agreement with a set point is provided.

U.S. Pat. No. 4,908,822 describes a multiplex system for addressing, controlling and monitoring the status of a multiplicity of electric devices which are distributed throughout a vehicle. A component of the multiplex system is two bus lines via which respectively identical messages are transmitted in series. In this case, the bus lines are each operated as single-wire buses which address a multiplicity of microcontrollers, each of the last of which respectively drives two control elements. Signals with a variable pulse duty factor can be impressed on the bus lines for test purposes, in order to thereby switch addressable control elements on and off. Switching means of the controllers provide current signals for representing the status of the element respectively driven.

Reference may be further made to German patent document DE 19611944 A1; WO97/36399; WO97/36398 and to patent application PCT/EP97/01534, which was submitted at the same time with the present application, the disclosures of which are expressly incorporated by reference herein.

In this case, German patent document DE 19611944 A1, describes an integrated semiconductor circuit with an electronic control unit having a microcontroller. Here, the control unit is able to communicate with other control units which are controlled by microcontrollers and for this purpose form a controller area network (CAN) in which communication is conducted on the basis of the protocol via a two-wire line. For this purpose each control unit has a bus protocol function.

According to the invention disclosed in DE 19611944A1, in the first embodiment, this circuit maximizes the availability of the CAN. This is accomplished because, on the one hand, it implements a transceive function which tolerates bus errors and also permits communication even in the presence of a bus error, and on the other hand it has means for detecting and treating bus errors, which in the case of an error isolates the bus from its normal subscriber terminations and reterminates it. As a result of this, while maintaining an ability to communicate, the circuit prevents (particularly in the case of very large CANs) parasitic currents from flowing away from subscribers via the bus into the bus error point in a bus-wide manner. The parasitic currents limit the availability of the network to the point of exhausting the battery in a battery-supported bus system. That circuit to this extent integrally increases the network availability on two levels, specifically on the level of communication and on the level of system energy. Another strategy, likewise for increasing the availability, is pursued by a different embodiment of that circuit.

WO97/36399 describes a method for determining potential displacements between electronic modules in a wire bus-type network, or the correspondence quality of their communication service levels in the network interconnection. Here, the bus medium comprises at least one wire which is connected electrically to the electronic modules. According to the invention disclosed in WO97/36399, an offset voltage is added in at least one bus subscriber (test subscriber) at the transmitting end to (at least) one (of the two) dominant, normal source level(s) and a test message is transmitted into the bus-type network by the test subscriber in this status. In this case, the source level is varied in a predetermined way. Depending on whether the (at least) one (of the two) dominant source level(s) is lowered or raised by the respectively adjustable offset voltage, the bus subscriber, which has a (reference-earth) potential error loses or gains its ability to receive. This condition is evaluated. Furthermore, WO97/36399 describes a device which comprises cooperative potential-controlling means hat are or can be connected to the transceiver function of a bus subscriber. Here, the device implements together with the controlling means, at least with respect to parts of the transmitting and/or receiving means of the transceiver function, at least one controllable voltage source which permits the exertion of an influence on at least one source level that is dominant during transmission and/or at least one signal level that is discriminant during reception.

WO97/36398 describes a semiconductor circuit for an electronic device which has at least one microcontroller. The circuit comprises at least one voltage regulator for providing, from a first supply voltage, at least one second supply voltage for the at least one microcontroller and for circuits of the device which cooperate with the microcontroller. Furthermore, as a monolith, this circuit comprises a transceiver function having transmitting and receiving means for coupling a microcontroller to a two-wire bus. According to a development of the invention disclosed in WO97/36398, this circuit further comprises watchdog functions, various wake-up functions and an interface via which serial data exchange is possible with the at least one microcontroller. Moreover, the circuit can have means for network-wide determination of bus subscribers with reference-earth potential errors and for quantifying such errors.

Various developments of these means in conjunction with special designs of the receiving part of the transceiver enable a bus-type network, for example of the CAN type, based on the circuit to make a latent determination (as the most important measure of the bus Q) of the margin of error still present in advance of the first occurrence of an operational failure caused by a level error.

PCT application PCT/EP97/01534 describes a method for testing the grounding of parts of a bus-networked system. In this case, steady-state potentials on bus lines are compared with reference-earth potentials which can be generated inside a bus subscriber. This comparison is used to infer (in each case) the quality of the interface between the bus subscriber under consideration and the earth reference conductor which is common throughout the network. A device for carrying out this method is also proposed herein.

Networked systems for control purposes which are based on a wire bus as means of communication are experiencing an increased importance. Examples are bus-type networks according to the J1850- or CAN-standard.

In such networked systems, a multiplicity of bus subscribers (these preferably being electronic controllers), of which each contains a microprocessor or a microcontroller, communicate with one another via a bus-type network. In the case of a CAN for example, the bus-type network comprises two conductor strands or wires which are normally keyed dominantly in phase opposition.

At the same time, there are also bus-type networks which use (as a bus medium) a single conductor strand or wire over an electric busbar or common surface. In these networks, though, the bus medium mostly serves as a power supply conductor. In this case, the subscribers communicate via the bus-type network via transmitting/receiving means (so-called bus transceivers). In each case, as an essential component of each bus subscriber, the so-called bus transceivers physically couple the latter to the bus-type network.

These transceivers for transmitting and receiving the data messages convert data messages from the logic level inside the relevant bus subscriber to signal levels on the bus wire or wires, and vice versa. With respect to different features (expedient within the scope of the present invention), of a suitable bus transceiver, explicit reference is made here to German patent document DE 19611944 A1 and WO97/36398.

With systems in an interference-critical environment, it is preferred to use two-wire bus-type networks in the interest of a high signal-to-interference ratio. This is because single-wire networks are more sensitive over a reference conductor surface to possible potential interference. In particular single wire networks are more sensitive to incoming and outgoing electro-magnetic interference. Furthermore, because of their (in this respect) limited radio-frequency electromagnetic compatibility (EMC), single-wire networks are preferably used in the case of relatively low data rates. Given a suitable design of their transceivers, such two-wire bus-type networks can also be operated (in an emergency) in the abovementioned single-wire operating mode, i.e., one of the two bus wires with respect to a reference-earth potential available in a network-wide fashion (if appropriate) with a lower data rate.

In such systems, normal communication takes place by keying in phase opposition of the two conductor strand potentials (in each case) from a recessive to a dominant single level, i.e., differentially. In the case of single-wire (emergency) operation or in single-wire networks, communication takes place (as a rule) by keying the single bus wire from a recessive to a dominant signal level with respect to the reference-earth potential bar or conductor surface. Data is transmitted in this case by virtue of the fact that different voltage levels are applied to the bus line(s). The data is determined by evaluating the corresponding voltage levels at the receiving end. If this is impaired in any way, depending on the effect, operational communication malfunctions are present which partially or completely nullify the availability of the networked system.

Consequently, in both the case of single-wire and two-wire bus systems, for example, the abovementioned signal levels are kept inside certain tolerance windows via special circuit measures. As a result, it is always possible for signals to be transmitted without interference between all the bus transceivers. In order to transmit data, a voltage level is applied to the bus wire at the transmitting end which is above or below a discrimination level. This discrimination level is defined as a threshold value in the receiving subscriber and must be overshot or undershot in order to enable detection of the presence of the abovementioned transmitting-end voltage level as a truth condition. As a result of this, in the case of certain, permissible deviations in a reference-earth potential between individual subscribers (in each case) it is still possible nevertheless for data to be exchanged between the subscribers.

In practice, to generate appropriate levels and tolerance windows, use is made of the fact that, for example, the microprocessor or microcontroller in each bus subscriber (in any case) requires an operating voltage which has to be to be kept within narrow limits. This operating voltage is derived, as a rule, from a primary potential via the voltage regulator which is also a component of the bus subscriber.

This relatively accurate operating voltage (internal to the subscriber) then determines the (one of the two) source level(s) dominant in the case of transmission, from which data are "keyed up", as it were, from the (respective) bus wire on a recessive level. Thus, for example, in a two-wire bus system according to the CAN standard, use is made of a dominant high level of, for example, 5 volts, that corresponds to a common supply voltage of 5 volts for integrated circuit functions which has to be kept constant in a relatively accurate manner in each bus subscriber in any case via electronic regulating means.

The transceivers are generally designed such that they still perform (in a manner free from error) the corresponding level conversions of the data messages. This is true even if the reference levels of the transceivers exhibit (with respect to one another) certain admissible potential differences which, respectively, do not exceed a maximum value.

Transmission problems occur in such systems, for example, when (for whatever reasons) the correspondence (within specified tolerance ranges) between the bus level(s), which is (are) set up in a dominant fashion in terms of transmission on the bus wire(s), and/or the effective discrimination level(s), tuned thereto in terms of reception, for evaluating the truth of signal edges or signal potentials when a bus-type network suffers or deteriorates to such an extent that the abovementioned maximum values are exceeded.

A similar statement holds analogously for network-wide malfunctioning of the recessive level window.

In a corresponding way, it is possible, for example, for signal overshooting, exceeding a certain limiting measure, on the bus bit shoulder, for example, because of terminating the bus line at subscribers in a fashion exhibiting discrepancies in wave impedance. It is also possible for signal rise times which are not (no longer) matched to one another to cause transmission problems which (when they coincide with problems based on fault potentials) can not only nullify the availability of a networked system, but can render difficult removal of the totality of faults.

For the purpose of the highest possible availability, two-wire bus-type networks and the transceivers used therein can preferably be constructed such that, for example, in the case of a short circuit of a bus wire (for example) with the reference-earth potential bar or reference-earth potential conductor surface, the abovementioned emergency communication is automatically rendered possible and instituted in the said single-wire operating mode via the other bus wire that is not affected by a fault.

In this case, however, the permissible faults or possible tolerance ranges, for example, for the recessive and/or dominant communication levels for single-wire (emergency) operation or in single-wire networks are then smaller or narrower, respectively, than in the case of differential two-wire (normal) operation.

The consequence of this can be that in the case where tolerance has already largely been exhausted for a communication level in the differential two-wire operation, when a short circuit then occurs of one of the two bus wires occurs, the level error (previously still permissible for the two-wire operation) on the bus wire not affected by the short circuit is already outside the tolerance range for permissible level errors in the single-wire (emergency) operation. As a result of this such an emergency operation can then be prevented.

The most important practical case of corresponding level disturbances are potential disturbances induced locally by subscribers. They occur when, for example, a supply potential of all the bus subscribers is drawn from a busbar or conductor surface of the system carrier which is used in a system-wide fashion, (i.e., spatially extended), but inside which a defective voltage drop occurs. Here, the result is that the affected supply potential (as seen from the bus medium) is no longer equal for all bus subscribers. The extended busbar or conductor surface has then (as seen from the bus medium) lost its function as a system-wide equipotential surface.

In the exemplary case of a controller in a transport means as system carrier, whose entire body is known to serve as distribution conductor surface ("earth"), such a thing can be due to a defective longitudinal voltage drop in this earthing surface. For example, due to a high fault current or else to a defective earth connection of a bus subscriber which, when the normal earthing current of the relevant subscriber is applied, leads to an excessively large local voltage drop. In that respect, it also leads to a rise in the reference-earth potential of the affected subscriber with respect to the earth potentials of the remaining subscribers in the bus-type network. As a result of this, such a subscriber can then, for example, no longer be addressed via the bus. This is because the discrimination level window of the receiver, not defective per se, of its bus transceiver appears to be raised by the absolute value of its earth base point fault voltage with respect to other subscribers, and is thus then too low in real terms in the subscriber for a communication.

It is clear from this practical example of interference caused by reference-earth potential errors that in the case of systems with very many subscribers the availability of the system, and to that extent the unlimited usability of a system carrier controlled by the system, for example a transport means, can be ensured only by safeguarding adequate separations of permissible limiting values of the bus level(s) set up on the bus wire(s), and/or of the effective discrimination level(s), adjusted thereto in terms of reception, for the truth evaluation of signal edges or signal status. Since, for example, potential errors in the earth path of controllers in transport means, for example, preferably develop in a creeping fashion owing to corrosion over time, intensely networked systems (with many subscribers) require an increased testing outlay by comparison with sparsely networked systems (with fewer subscribers) in order to be able to ensure availability or usability which is sufficiently reliable.

As for the signal levels, this also holds in a similar way for other transmission parameters subject to limiting values in a system-wide fashion such as, for example, the slew rate compliance, the overshoot damping measure, etc., which, in conjunction with adequate limiting value separations of the above-named signal levels, define a measure of the bus quality or network quality and which can be used to derive a variable that characterizes the reliability of the availability of the overall system.

It is therefore an object of the invention to provide a method for testing and safeguarding the availability of a networked system which minimizes the outlay to be made in order to ensure a reliable availability of the system.

This and other objects and advantages are achieved by the method according to the invention, by virtue of the fact that during operation of the system, signals present on the bus-type network are discriminated or tested or measured with respect to at least one signal criterion by individual subscribers under conditions defined in a network-wide fashion for all subscribers. Here, characteristic status data is generated (in each case) for each signal criterion with respect to each subscriber and is collected and arranged in at least one status map of the system. The status data characterizes both the current and at least one earlier status with regard to the tested subscribers with respect to the at least one criterion further, at least one measure of the margin of error of the networked system with respect to the at least one criterion is obtained from the status data.

As a result, it is possible to detect during normal system operation, but in any case on the occasion of maintenance of the system carrier, that is at the inspection intervals thereof, whether there was or is present in the system operation a measure of the margin of error of the system which is still adequate or no longer adequate with regard to the at least one criterion and, if appropriate, requires a preventative measure which continues to safeguard the availability of the system or in the case of latent impairment of an emergency operation restores the potential possibility of the emergency operation. Such an anticipatory serviceability, which is thus provided even before the first occurrence of a communication fault or communication defect, maximizes the availability of intensely networked and/or generously fitted system carriers. As a result, unnecessary service routines can be eliminated.

With regard to potential errors in subscribers, the operability of data-receiving subscribers is checked by virtue of the fact that signals are transmitted at a voltage level that is displaced by comparison with the normal transmission of data. Furthermore, at which measure of the displacement of this voltage level at least individual subscribers can no longer receive data is checked, and at least one status map is drawn up in which it is stored with reference to the individual data-receiving subscribers in the form of status data at which displacement of said voltage level at least individual subscribers can no longer receive data (13.3) and/or at which (further) displacement of said voltage level which subscriber or subscribers can, as a last one or ones, still receive data.

This method can be used to check the data-receiving subscribers with regard to the position of their reference-earth potential relative to the position of the reference-earth potential of the transmitted data. Thus, by virtue of the fact that the reference-earth potential of the transmitted data is varied continuously or in steps until it is just no longer possible to receive data, it is possible to determine, taking account of the determined tolerance which was determined assuming that no deviations occur in the reference-earth potential, the extent to which the reference-earth potential of a data-receiving subscriber is displaced with respect to the desired value.

It is advantageously possible by evaluating the status data stored in the map to determine the extent to which a subscriber or the totality of all subscribers of the networked system are in a state of critical potential. It is thus possible thereby to detect a displacement of the reference-earth potential of individual subscribers in a networked system at an early stage, that is to say as early as when the displacement has not yet had the effect that this subscriber can no longer communicate with other subscribers because owing to reference-earth potential differences the signal voltage levels can no longer be discriminated with respect to the threshold values at the receiving end.

In still another embodiment of the present invention, with regard to potential errors in subscribers, the operability of data-transmitting subscribers is checked by virtue of the fact that signals are transmitted by at least one data-transmitting subscriber and, furthermore, to what extent the level of the received signals deviates from the desired value of the signal level in the case of normal transmission of data is checked, and at least one status map is drawn up in which a measure of the deviation determined is stored with reference to the individual data-transmitting subscribers.

This method can be used to check the data-transmitting subscribers with regard to the position of their reference-earth potential relative to the position of the reference-earth potential of the receiving data. Thus, by virtue of the fact that a reception-discriminant reference-earth potential, for example the voltage level, monitored for being overshot or undershot by the data signal, is varied continuously or in steps in a receiving subscriber until it is just no longer possible to receive data, it is possible, taking account of the tolerance determined in the case of absent deviations in the reference-earth potential to determine the extent to which the reference-earth potential of the data-transmitting subscriber is displaced with respect to its desired value. It is advantageously possible by evaluating the status data stored in the map to determine the extent to which a subscriber or the totality of all subscribers of the networked system are in a state of critical potential.

In still another embodiment according to the invention, the signals are transmitted by at least one subscriber of the networked system at a signal level displaced by comparison with the normal transmission of data.

As a result, it is advantageously possible, on the one hand, to minimize the outlay on hardware by virtue of the fact that, for example, only one subscriber of the networked system also takes over this function. Moreover, it is also possible to determine suitable testing times in a flexible way. Such checking can be initiated, for example, whenever it is determined on the basis of the operating conditions of the network that the bus is instantaneously not being used to capacity. This checking cannot then cause interference in the data bus during operation.

In yet another embodiment according to the invention, the checking is carried out by at least one data-receiving subscriber.

As a result, it is advantageously possible, on the one hand, to minimize the outlay on hardware by virtue of the fact that, for example, only one subscriber of the networked system also takes over this function. Moreover, it is also possible to determine suitable testing times in a flexible way. Such checking can be initiated, for example, whenever it is determined on the basis of the operating conditions of the network that the bus is instantaneously not being used to capacity. This checking cannot then cause interference in the data bus during operation. Moreover, checking carried out by a subscriber which receives data influences only the operation of this one subscriber. The operation of the rest of the network is not affected thereby.

In an embodiment of the invention, the smallest measure of the margin of error among individual subscribers is obtained with respect to the at least one criterion from the status data, and the relevant subscriber is marked correspondingly in the status map.

It is possible thereby to detect during the normal system operation, but in any case on the occasion of maintenance of the system carrier, that is to say at the inspection intervals thereof, to detect whether and, if appropriate, which of the system subscribers had or has in the system operation the smallest and, possibly, no longer adequate margin of error with regard to the at least one criterion and, if appropriate, requires a preventative measure so that the availability of the system continues to be reliably provided and the possibility of its emergency operation is reliably provided at any time. It is also advantageously possible by appropriate evaluation of the data stored in the status map to detect whether, for example, a very specific grouping of subscribers is in a critically small margin or error of communication, for example in the case of the presence of potential errors, for example in subscribers of a power supply cluster.

In the case in which a subscriber already has a communication fault because of a no longer adequate margin of error in the at least one criterion, information on the defective subscriber is obtained directly, and the cause of the fault active in it can be verified without any problem from the status map.

In a further embodiment of the invention, the method is carried out on the occasion of the normal commissioning and/or normal decommissioning of the system carrier.

As a result of this measure, it is advantageously possible for an early warning to be triggered as early as during the commissioning of the system carrier, should it be necessary to expect operation which is close to defective, or it is possible to retain the most recent/last state before the occurrence of a system status close to defective on the occasion of a further commissioning. While the first favours security, the second can substantially alleviate servicing the system.

According to another embodiment of the invention, the method is repeatedly carried out in the course of each operation of the system. It is thereby advantageously possible for sporadically occurring irregularities and shrinkage of the margin of error to be detected statistically even during network operation and stored in data form in the status map.

According to an even further embodiment of the invention, a rise time measure, an overshoot measure or a settling time measure of a data signal is discriminated or tested or measured during or after a change in status thereof. Deviations (gradual) from the norm outside permissible tolerances in the case of individual subscribers in the networked system are thus detected early, i.e., already in a stage in which the normal communication within the overall system is not yet disturbed. This is very important, since, for example, once they are strongly expressed reflection-induced communication disturbances can necessarily be diagnosed only expensively.

In a development or an embodiment according to the invention, a reference-earth potential of individual subscribers in the networked system is discriminated or tested or measured. As a result, a (gradual) displacement of the reference-earth potential of individual subscribers in the networked system is detected early, that is to say as early as at a stage in which the displacement of the reference-earth potential of a subscriber has not yet had, or is not sufficient to have the effect that normal communication within the entire system or of this subscriber with one or more other subscriber(s) has been disturbed or become impossible. This is an important feature in ensuring reliable possibilities, that is to say single-wire ones, of emergency operation.

In accordance with a further embodiment of the invention, discriminating or testing or measuring of the reference-earth potential of individual subscribers in the networked system is performed by detecting at least one recessive or dominant signal level in individual subscribers.

This development of the method is useful in a particularly advantageous way when the subscribers in the system in any case contain discriminating means, testing means or measuring means for level values. It is then advantageously possible to minimize the outlay on hardware by virtue of the fact, for example, that it is possible to dispense with means for influencing the signal level at the transmitting end. In this case, the advantages multiply via increasing resolution of the discriminating means, testing means or measuring means for level values, which are also included in the subscribers in the system. Such means can, for example, be components of the receiver part of the transceiver of subscribers (compare WO97/36399, WO97/36398), or else can be assigned to other A/D converting means as a component of a circuit which also includes the transceiver (compare PCT/EP97/01534).

The determination of suitable testing times can be very flexible. By virtue of the fact that the discriminating function, testing function or measuring function can be integrated into the software for operating the networked system, this function can advantageously be used in the course of normal communication operation in the network. At the same time, it can also be initiated when it is determined on the basis of the operating conditions of the system that the bus-type network thereof is instantaneously not being used to capacity. It is then impossible, in any case, for there to be disturbances or flowing down of the data throughput during operation of the bus-type network.

In an even further embodiment of the present invention, discriminating or testing or measuring the at least one recessive or dominant signal level is performed by sampling, by data signal concatenation, the potential on the at least one bus wire within a sampling time which is shorter than a bus bit time of the data signals, that is to say analogous in terms of time to detecting dominant signal levels in accordance with WO97/36399, as FIGS. 25 and 26 there, or in accordance with WO97/36398, as FIGS. 40 and 41 there.

For example, the (in practice) never completely suppressible overshooting of the data signal after level status transitions on the at least one bus wire is thereby suppressed from discriminating, testing or measuring, as a result of which erroneous assessments are excluded.

In an advantageous way, reference-earth potential displacements can thus be detected in the course of normal system operation, it being possible within the scope of the software for operating the networked system to assign in each case to at least one other subscriber the role of a "measurement witness" with respect to the verification of the offset, which can be determined during load changing, of the at least one recessive signal level.

In accordance with another embodiment of the invention, a (gradual) displacement of the reference-earth potential can be determined in the case of at least one subscriber during receiving operation thereof by virtue of the fact that a discrimination or measurement is performed in this subscriber of at least one dominant source level fed onto at least one line of the bus-type network, the respectively fed dominant source level being offset with respect to the normal dominant signal level in a respectively predetermined way, and the respective offset being stored in the form of status data in the status map as a function of the discrimination result or measurement result obtained in the receiving subscriber.

In this development, it is possible, for example, to make advantageous use of level discriminators which are also components of receiver parts of the subscribers in the system. Discriminating or measuring can thus be reduced, for example, to checking for which offset of the at least one dominant source level individual subscribers are no longer able to receive data or can receive data again. Consequently, data stored in the status map represent offset values, assigned to the individual receiving subscribers, of said at least one dominant level.

Thus, it is possible by means of this method to check the data-receiving subscribers with respect to the position of their reference-earth potential relative to the position of the reference-earth potential of the subscriber respectively transmitting data. By virtue of the fact that the reference-earth potential of the data-transmitting subscriber is varied continuously or in steps until it is just no longer possible to receive data or until it is just possible to receive data again, it is possible, taking account of the permissible tolerance of the dominant signal level in the bus-type network (which has been determined assuming that no offsets are present in the reference-earth potential in the case of individual subscribers), to determine the extent to which the reference-earth potential of a receiving subscriber is displaced, specifically under all operating conditions in the case of reception, that is to say both in the quiescent state and under operating conditions or test load conditions.

According to another embodiment of the invention, it is possible for a (gradual) displacement of the reference-earth potential to be detected in the case of at least one subscriber during transmitting operation thereof by virtue of the fact that a discrimination or measurement is performed of at least one dominant signal level fed onto at least one line of the bus-type network by this subscriber by virtue of the fact that a reception-discriminant reference level is offset in a respectively predetermined way in the case of or in at least one receiving subscriber, and the respective offset is stored in the form of status data in the status map as a function of the discrimination result or measurement result obtained in the receiving subscriber.

It is advantageously possible in the case of this development, as well, to make use of level discriminators which are also components of subscribers. Discriminating or measuring can thus be reduced, for example, to checking for which offset of their reception-discriminant reference level individual subscribers can still receive data. Consequently, data stored in the status map represent offset values, assigned to the transmitting subscriber, of said at least one reception-discriminant reference level.

According to yet another embodiment of the invention, discriminating or testing or measuring or checking with respect to a specific subscriber is undertaken in each case by at least two other subscribers in the network (witness function).

Within the scope of the software for operating the networked system, at least one other subscriber is in this case assigned the role of a "measurement witness" for verifying a determined signal criterion or potential offset of an individual subscriber. It is possible by means of this measure for discrimination errors, testing errors and measurement errors, in particular owing to influences from the system carrier, to be reduced, and for the detection of statistically occurring errors to be enhanced.

In still another embodiment of the invention, discriminating is or testing or measuring or checking with respect to a specific subscriber is undertaken identically with respect to at least one further comparison subscriber as well, and a plausibility selection is made in the status map with respect to the result.

In this case, the identical comparative measurement can be undertaken, for example, in an alternative fashion, in an alternating fashion or for the purpose of master-slave processing. Within the scope of the software for operating the networked system, the status map is in this case assigned the role of an "acceptor" or "approver" with respect to a plausible selection from a plurality of discriminating results, testing results, measuring results or checking results.

By virtue of the fact that, for example, discriminating or measuring is undertaken by different receiving subscribers, it is possible to evaluate on the basis of a plausibility confirmation supported by a witness or acceptor whether the change in a signal criterion, for example a displacement of a reference-earth potential, is caused at a data-receiving subscriber or at a data-transmitting subscriber. If, for example, a reference-earth potential displacement is determined by a plurality of data-receiving subscribers, it is possible to conclude under specific preconditions that the determined potential displacement is present, rather, at the data-transmitting subscriber. By virtue of the fact that data relating to the relative position of a plurality of data-receiving subscribers are exchanged, it is thus also possible to detect and evaluate in a particularly simple way where a disturbance has been caused in the network topology.

In a development of an embodiment according to the invention, data signals having at least one dominant source level offset with respect to the normal dominant level are transmitted into the bus-type network by at least one subscriber of the networked system.

By virtue of the fact that in the case of this development of the method, for example, only one subscriber needs to be equipped for generating offset dominant source levels, it is also possible thereby to achieve an advantageous minimization of the outlay on hardware.

According to an even further embodiment of the invention, it is possible to make use of level discriminators which are also components of receiver parts of the subscribers in the system, with the result that there is no need to make an outlay for special level discriminators or, for example, A/D conversion means. This serves to minimize the outlay on hardware.

According to another embodiment of the invention, the discriminating or testing or checking or measuring is performed under network-wide defined quiescent conditions and/or operating conditions or test load conditions of individual subscribers.

If consumers with current-supplying subscribers are subjected to quiescent conditions and load current conditions or test load conditions, it is possible, by evaluating the status data stored in the map, to detect advantageously in a simple way the extent to which individual subscribers are in a critical state as a function of supply with regard to their reliable ability to communicate.

In accordance with yet another embodiment of the invention, the status map is operated in at least one subscriber permanently belonging to the networked system. As a result, the status data characterizing the system status with regard to the tested subscribers with respect to the at least one criterion are advantageously available at anytime in the system. On the other hand, discriminating or testing or checking or measuring can thus also be performed cyclically, for example, during the operation of the networked system.

According to another embodiment of the invention, the status map is stored in a non-volatile fashion. All the data in the status map are advantageously protected thereby against loss in the case of power failure or decommissioning of the system or system carrier. Moreover, it is thus possible to access the status data at any time—for example at specific event intervals.

In another embodiment according to the invention, the status map is updated continuously, older parts of the contents being overwritten with newer parts of the contents. It is advantageously ensured as a result that the status map always has the most up-to-date status data ready.

According to another embodiment of the invention, (the) status data characterizing at least one earlier system status are held at least temporarily in the status map together with (the) status data, characterizing the current system status. In an advantageous way this measure renders possible event-dependent evaluations which have recourse to the prehistory of the margin of error. For example, it thus becomes possible to evaluate impairments which occur only occasionally or in a fashion statistically distributed over time.

According to even a further embodiment of the invention, at least one trend variable is derived with respect to the tendential development of a deviation or of a measure of the margin of error of the at least one signal criterion in the system from status data which are at least temporarily present in the status map and characterize the current and at least one earlier system status. The at least one trend variable advantageously provides a direct measure for the degree of urgency of an anticipatory measure for the purpose of safeguarding the availability of the system. Apart from that, this development of the method renders it possible to assess the network quality of the system over time both with respect to appropriate individual criteria and overall.

According to still a further embodiment of the invention, the derivation of the trend variable is undertaken by means of the software for operating the networked system. This results in the advantage that the trend variable can be determined in a particularly simple way outside the status map as well, for example in a subscriber of the networked system, and that the network communication can be transferred in a subordinate fashion into the status map.

According to yet a further embodiment of the invention, the deviation or the measure of the margin of error and/or the at least one trend variable is/are held in the status map in a non-volatile fashion. As a result of this measure, it is advantageously possible, for example after a system failure has occurred, for the cause thereof still to be reconstructed. On the other hand, it is thus possible after a subscriber failure or system failure to find information in a simple and reliable way for the purpose of quickly restoring the system again. The permanent possibility of fetching such trend data also renders possible in a cost-effective way simple and informative displays of critical communicative operating conditions of individual subscribers of the system directly on the system carrier.

According to another embodiment of the invention, the discriminating or testing or checking or measuring and at least one of the operations of collecting, conditioning, arranging and evaluating status data in the status map are undertaken by an online diagnostic program which is integrated with or into the software for operating the networked system and, with regard to its execution, is subordinate to the normal network operation and to that extent runs in a latent fashion.

By virtue of the fact that to this extent at least a part of the care and/or management of the status map is integrated into the software for operating the networked system, discriminating, testing or checking or measuring can, for example, advantageously be initiated as often as permitted by the instantaneous communication requirements up to using the bus-type network to capacity. As a result, on the one hand disturbances or retardations of the data throughput during operation of the bus-type network are excluded, and on the other hand a high degree of updating of status data available from the status map is ensured by virtue of the fact that light-load phases of the communication in the network can advantageously be utilized for updating and caring for the status map.

According to another embodiment of the invention, there is connected as a further subscriber to the networked system a test instrument which reads out at least parts of the status map. It is possible as a result to carry out routine checks in an advantageous way on the occasion of inspections of the system carrier by means of test instruments which are particularly simple and easy to manipulate. On the one hand, it is possible thereby to use the data characterizing the system status with regard to the tested subscribers with respect to the at least one criterion to condition corresponding trend data outside the networked system as well. On the other hand, it is possible thereby advantageously to detect in a simple way during routine inspections of the system carrier when the communicative operating conditions of a subscriber worsen or have worsened critically and call for prevention.

In another embodiment according to the invention, at least one subscriber permanently belonging to the system is fitted with display devices and/or signalling devices, and given overshooting of an upper limiting value for the measure of the deviation or the trend variable, or given undershooting of a lower limiting value for the at least one measure of the margin of error, this status is indicated or signalled by the subscriber. It is possible by means of this measure, for example, for a user of the system carrier to be made aware without damage of an inspection requirement even during operation of this system carrier.

According to another embodiment of the invention, parts of the status data stored in the status map and/or the measure of the deviation or a measure of the margin of error of the system or of a subscriber, and/or the at least one trend variable is/are written into an electronic authorization means for using and/or for commissioning the system carrier. According to this development, it is possible in an advantageous way for corresponding data to be written into or written back to an electronic "authorization key" of a system carrier when the latter is commissioned or before it is decommissioned. This opens up novel security functions and can, in addition, support the rationalization of the inspection operation for appropriately equipped system carriers.

According to even a further embodiment of the invention, after the commissioning and initialization of the networked system a first discrimination or testing or checking or measuring is undertaken immediately, and in this process a smaller number of subscribers and/or a smaller number of signal criteria are selectively subjected to being discriminated or tested or measured than in the case of the subsequent further conduct of the method. It is possible by means of this measure, for example, to test the communicative ability and operability of a subscriber bearing a status map in a particularly time-saving fashion immediately after initialization.

According to another embodiment of the invention, at least two status maps are provided and used in two different subscribers of the system. It is possible by means of this measure, inter alia, to achieve a high degree of security against loss of information.

According to even a further embodiment of the invention, provided in the system are two different status maps which are changed and/or processed and/or read out independently of one another in each case for different test methods and/or test programs. It is possible by means of this measure, for example, for the availability of specific subscribers to be safeguarded separately, and for specific status data to be protected against unauthorized access.

According to still a further embodiment of the invention, in the course of discriminating or testing or checking or measuring, at least individual subscribers respectively supply operating currents to at least one electrical consumer external to the subscriber. It is possible by means of this measure for potential errors or EMC interference, caused inside the system, of individual subscribers to be detected and located particularly effectively.

In accordance with another embodiment of the invention, a test load which can be driven via the bus-type network for the purpose of providing current is provided at least in individual subscribers of the system, and said load is driven in the course of discriminating or testing or checking or measuring. It is possible by means of this measure for potential errors or EMC interference caused by the subscriber itself to be detected particularly effectively. Furthermore, it is possible by means of this measure, for example, to test the overload-carrying capacity of the power supply terminals or of the corresponding supply lines of individual subscribers.

If subscribers with an internal test load are subjected, for example, alternately or in an alternating fashion to different quiescent conditions and load current conditions or test load conditions, it is possible given knowledge of the network topology of the system to reach a PARTICULARLY EFFECTIVE conclusion on the location (of the production) of a fault on the system carrier which, although it does influence the system, has a cause outside the system, doing so, for example, with the aid of reference-earth potential displacements of different subscribers or with the aid of coupling and/or electromagnetic signal impairments in the case of different subscribers by evaluating corresponding status data from the at least one status map.

In accordance with another embodiment of the invention, the external operating voltage, which can be detected inside subscribers, or a voltage derived therefrom is also discriminated or tested or checked or measured, and with respect to this status data are generated and stored and/or processed and/or evaluated in the at least one status map. It is possible by means of this measure also for potential errors or EMC interference, caused inside the system, of individual subscribers to be effectively detected and/or located. Furthermore, it is possible by means of this measure, for example, to test the overload-carrying capacity of the power supply terminals or of the corresponding supply lines of individual subscribers.

According to another embodiment of the invention, at least one status map has a subscriber identification section, a status data stack and a data processing section.

According to yet another embodiment of the invention, the identification section comprises a table via which each system identifier and/or subscriber in the system is assigned as required its topological identification or a topological identifier within the network.

According to another embodiment of the invention, the data stack comprises a multiplicity, corresponding to the number of signal criteria to be tested, of register stacks in which or through which are routed status data in accordance with their aging progress.

According to another embodiment of the invention, the data processing section has at least one area for data selection and one area for data processing, it being the case that status data are selected and/or reorganized in the former at least in terms of minimum and maximum values, and data indicative of change are generated in the latter from status data as a function of their age and/or temporal occurrence.

Advantages of the four last named developments relating to the method are shown in the description of the figures.

In accordance with an even further embodiment of the invention, the method is carried out in the case of a transport means. This produces a high availability and security against accidents caused by system failure.

The drawing first illustrates some hardware details which subscribers can have, by way of example, in order to permit specific method steps to be carried out. Without this representation laying claim to completeness or signifying any limitation of the invention, the exemplary case of a reference-earth potential test is taken up here. Within the scope of the invention, it is possible for this purpose and for testing signal criteria which are not associated with potential for subscribers nevertheless also to provide quite other means (The hardware details shown are taken partly from WO97/36399, for which reason the description is kept short. For further details, reference may be made to WO97/36399 and, regarding aspects of the circuitry, to DE19611944, WO97/36398 and PCT/EP97/01534).

There now follow figures for the purpose of illustrating specific method details which are described hereafter.

DETAILED DESCRIPTION OF THE DRAWINGS

Figure 1:
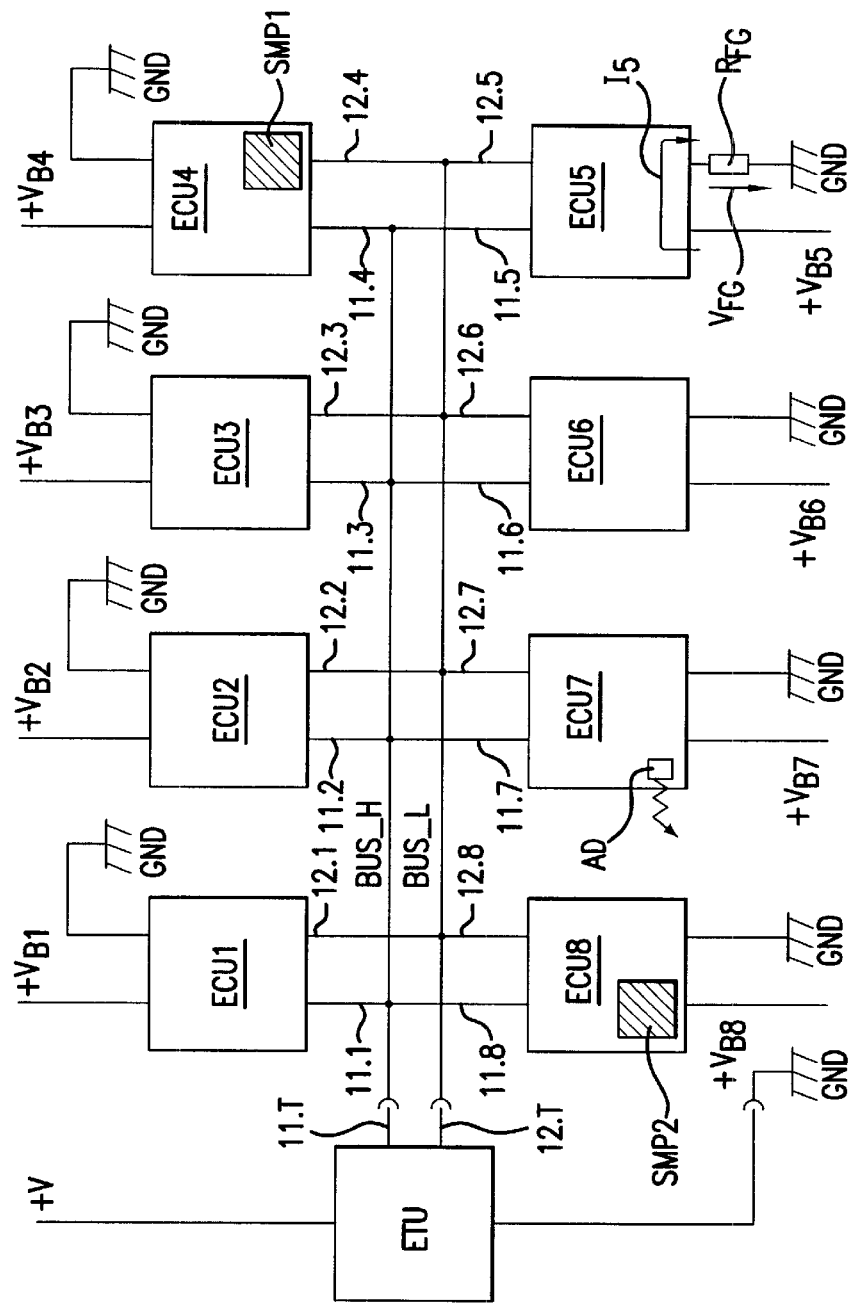
FIG. 1 shows a diagrammatic illustration of a networked system having different subscribers on a two-wire bus.

FIG. 1 illustrates in a diagrammatically simplified fashion a networked system which the method according to the invention serves to test and to safeguard its availability. By way of example, eight subscribers ECU1 to ECU8 are networked to one another for communication via a two-wire bus having bus lines BUS_H and BUS_L via in each case two connections 11.1 and 12.1 to 11.8 and 12.8. The subscribers ECU1 to ECU8 are supplied with operating voltage and operating current from, for example, positive supply potentials $V_{B1}$ to $V_{B8}$ with respect to a common equipotential bar GND. Also represented is a test instrument ETU which is connected by means of corresponding connections 11.T and 12.T, for example only temporarily, to the bus lines BUS_H and BUS_L and which is supplied with operating current from, a particular positive potential $V_{TU}$ with respect to the common equipotential bar GND of the networked system. To this extent, the system shown is temporarily expanded to nine subscribers by virtue of the fact that the test instrument can normally communicate with the remaining subscribers ECU1 to ECU8 via the bus BUS_H/BUS_L.

The communication between the subscribers ECU1 to ECU8 can be impaired or endangered for many types of reason, it being the case that errors which can already be detected or become evident immediately in normal operation or even in the case of system initialization, such as short circuits or interruptions in the bus-type network, for example, are of no interest here. For example, signal levels can be impermissibly displaced, or edges can be impermissibly deformed, and this leads to increased overshooting or to bit signal shoulders which are disturbed or too short, or reference-earth potential errors caused at the subscribers can be present which lead indirectly to signal level displacements for affected subscribers and their communication with the remaining subscribers. It is possible by appropriately equipping the subscribers for such changes in the, or deviations from, normal signal criteria to be discriminated, tested or measured.

From among the plenitude of possible signal criteria which can be tested in an anticipatory fashion within the scope of the method according to the invention, reference-earth potential errors are dealt with below by way of example and in a representative fashion, but this does not amount to any sort of limitation of the invention.

The supply potentials $V_{B1}$ to $V_{B8}$ can be mutually independent potentials or potentials which are at least partly (approximately) equal. By way of example, the subscriber ECU7 has a signalling element AD, in the simplest case a warning lamp or a tone generator, for example. In the present case, two subscribers at the same time contain a status map in the meaning of the invention, specifically the subscriber ECU4 containing a first, and the subscriber ECU8 containing a second status map SMP1 and SMP2, respectively. It is possible within the scope of the invention to use the status map SMP1 to detect and store specific first signal criteria, and to use the status map SMP2 to detect and store specific second signal criteria. It is possible, nevertheless, within the scope of the invention for the status map SMP2 also to be a fail-safe duplicate of the status map SMP1, or vice versa, or different test programs can use different status maps or be provided for these.

For the sake of clarity, the consumers which are supplied via the subscribers ECU1 to ECU8 with operating current from the potentials $V_{B1}$ to $V_{B8}$ are not illustrated in FIG. 1; they can be understood here as components of ECU1 to ECU8. Thus, neglecting small, unavoidable loss currents via the bus or the load circuit thereof (compare DE 19611944 to PCT/EP97/01534), it can be assumed by way of approximation that the operating currents drawn from potentials $V_{B1}$ to $V_{B8}$ flow off to the common equipotential bar GND, as is illustrated by way of example only for the subscriber ECU5 with the aid of the current $I_5$. A special feature is indicated in the case of subscriber ECU5, specifically a poor earth connection to the equipotential bar GND of the system, which causes a resistance $R_{FG}$ and, as a consequence thereof, an offset voltage drop $V_{FG}=(I_5*R_{FG})$. This offset voltage drop causes the earth terminal of the subscriber ECU5 to float by the absolute value of the base point offset voltage $V_{FG}$ above the equipotential surface GND, that is to say it no longer refers to the reference-earth potential used in a system-wide fashion. Fluctuations in the current $I_5$ and/or the resistance $R_{FG}$ lead to a corresponding upward and downward floating of the subscriber ECU5 above GND. As explained in more detail below, this can lead to an inability, induced by the signal level, of the subscriber ECU5 to communicate with other subscribers or the remainder of the system, even if all remaining signal criteria are otherwise effectively fulfilled (for example, rise time, overshooting, bit shoulder width, etc.).

Figure 2:
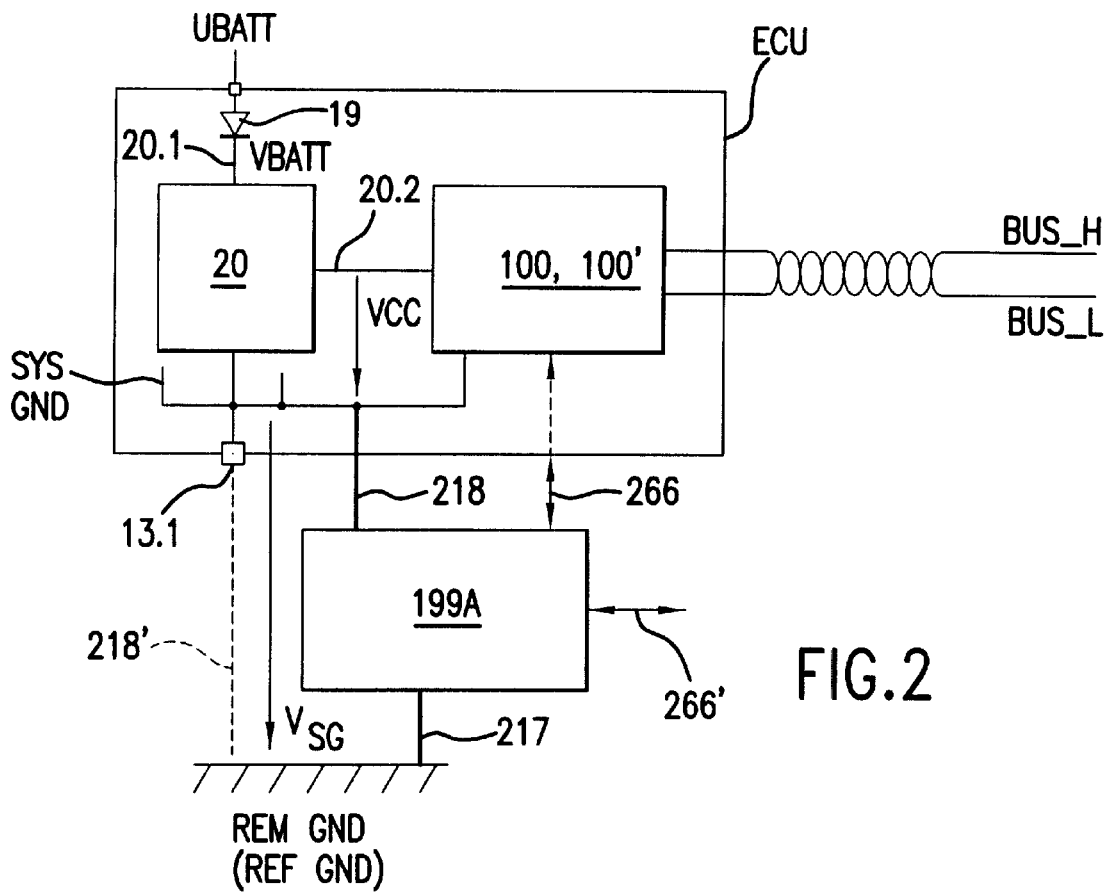
FIG. 2 shows an illustration in the form of a block diagram of a simulation module in connection with a subscriber with a two-wire bus capability (similar to WO97/36399, FIG. 1 therein)

For the purpose of measuring—by compensation—such an earth base point offset voltage $V_{FG}$ of a bus subscriber, in FIG. 2 a simulation module 199A is connected in the normal (dashed) earth operating current path 218' of another bus subscriber ECU, this normal path running here, by way of example, between an earthbar SYStem GrouND (SYS GND) inside the subscriber—connected to a terminal 13.1 of the subscriber ECU—and a supply earth point REMote or REFerence GrouND (REF or REM GND) in the application environment.

The supply circuit of the subscriber ECU is connected on the earth side of the earthbar SYS GND inside the subscriber via the connections 217 and 218, emphasized by thick lines, and the simulation module 199A.

The operating voltage UBATT is fed by a supply bar (not represented) to the bus subscriber ECU. If appropriate, said voltage is reduced by a small voltage drop across a polarity reversal protecting element 19 to VBATT, and supplies the input 20.1 of a voltage regulator 20, whose base point is connected to the abovementioned earthbar SYS GND. Also connected to the latter is the earth-side supply terminal of the bus transceiver 100, 100' which, for the purpose of power supply can be fed a stabilized supply voltage VCC of, for example, 5 volts from an output 20.2 of the regulator 20. All the remaining electric components in the subscriber ECU are also connected to the earthbar SYS GND inside the subscriber.

The bus transceiver 100, 100' is connected to a two-wire bus BUS_H/BUS_L via which the bus subscriber ECU can communicate with corresponding other bus subscribers. It can be equipped for two-wire and one-wire reception, it being possible in differential two-wire operation for a different response level to be active, depending on the wire, than in the case of reception only from the wire respectively considered. A connection 266 is provided between the bus subscriber ECU and the simulation module 199A. That connection can also exist between the bus transceiver 100, 100' and the simulation module 199A. For the case in which the simulation module 199A is a component, for example, of a mobile test instrument—that is to say ETU in FIG. 1, for example it is also possible to provide a control connection 266', for example to a computer or the like (not shown here). Thus, the simulation module 199A here clearly replaces the defective earth resistance $R_{FG}$ in FIG. 1, which there causes a base point offset voltage $V_{FG}$ of the subscriber ECU5 which impairs communication. The effect of this offset voltage with regard to the receiving ability of the subscriber ECU5 permits the simulation module 199A according to FIG. 2 to be compensated without this requiring the receiving thresholds to be changed in the subscriber ECU5.

Figure 3:
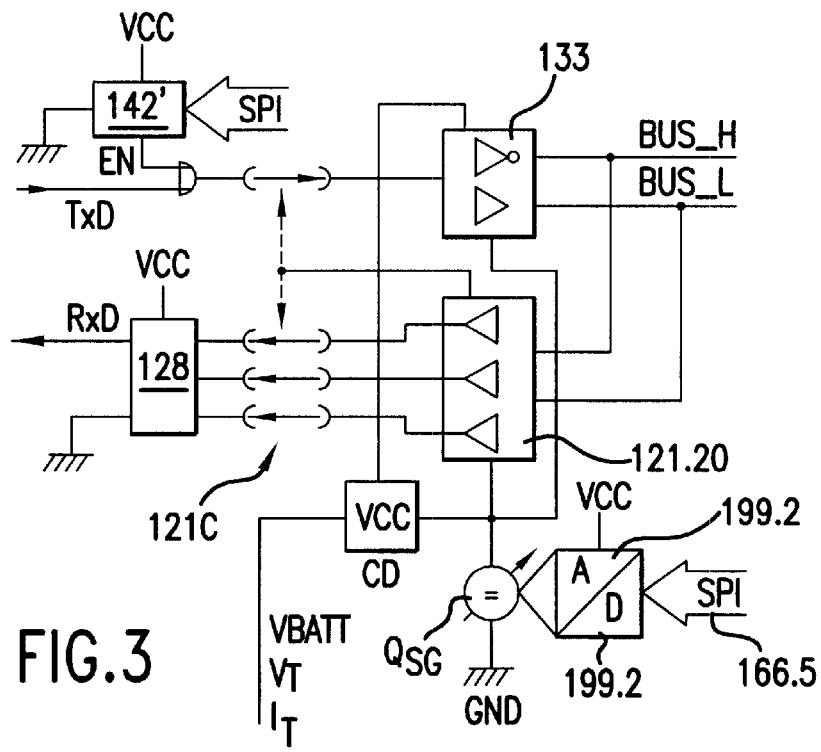
FIG. 3 shows a block diagram of elements of a transceiver of a subscriber (similar to WO97/36399, FIG. 37 therein)

Shown in FIG. 3 by way of example is a design of device elements in the bus transceiver of a subscriber which is suitable for earth potential error analyses and in the case of which the supply terminals both of the discrimination part 121.20, which operates in analog fashion, of the receiving part, and the transmitting output stage 133 of the bus transceiver are supplied from one and the same voltage terminal or voltage regulator CD, and to this extent can be jointly raised above an earth potential GND in a corresponding way by means of a base point offset source $Q_{SG}$ which can be driven digitally. Both at the transmitting end and at the receiving end, current paths which provide a flexible potential connection of the digital signals TxD and DH, DD and DL are likewise indicated, as is a memory 142' to permit blocking of the output stage 133 (no bus access). It may be seen that such a design is suitable for potential error testing of receiving and transmitting subscribers.

Figure 4:
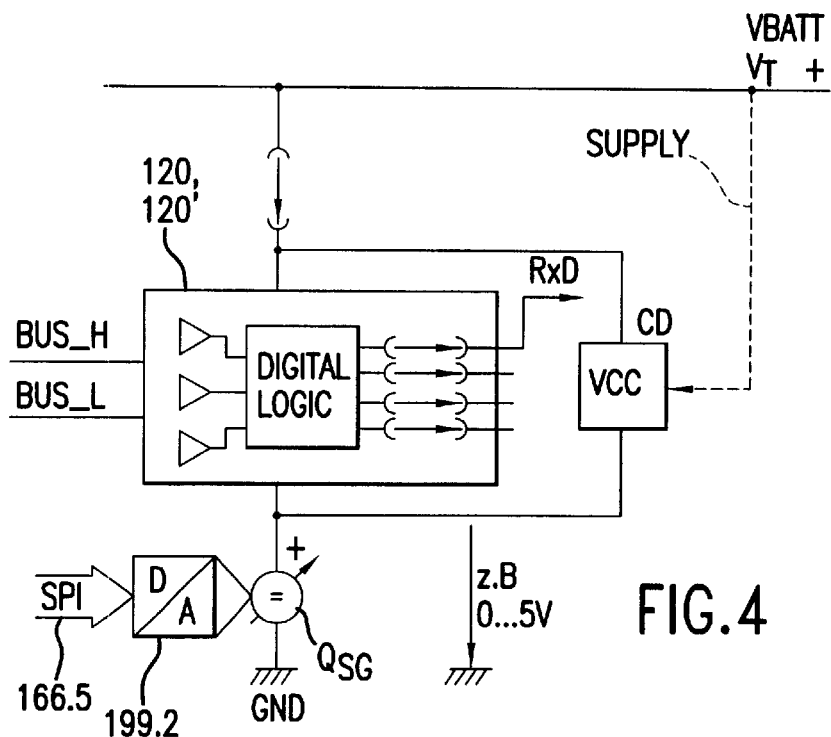
FIG. 4 shows a block diagram of elements of a receiving part of a transceiver of a subscriber (similar to WO97/36399, FIG. 34 therein)

According to FIG. 4, the whole receiving block 120', 120", including the digital part, of a transceiver of a subscriber constantly supplied with a voltage VCC by means of a voltage terminal or of a regulator CD, can be raised as appropriate by, for example, 0 . . . 5 volts, by an offset source $Q_{SG}$. In this case, internal threshold voltages $VT_H$ and $VT_L$ (compare FIG. 6, bottom) can be switched inside the receiving block to fixed "deviation values" stipulated in a network-specific fashion, or can be variable in order to monitor the voltage levels on the two bus lines BUS_H and BUS_L. To this extent, this example constitutes a modification of the example according to FIG. 2, by virtue of the fact that the starting point here is a digital evaluation unit which floats together with the input comparators while, in terms of signal flow, it must, for its part, be connected here on the output side via logic current paths to the circuit environment. A subscriber fitted in this way can, for example, test a transmitting subscriber if the latter is transmitting without a load or under an operating or test load, as a result of which in the case of each subscriber the current flow and, for example, the lack of earth contact cause the formation of a defective base point voltage drop.

Figure 5:
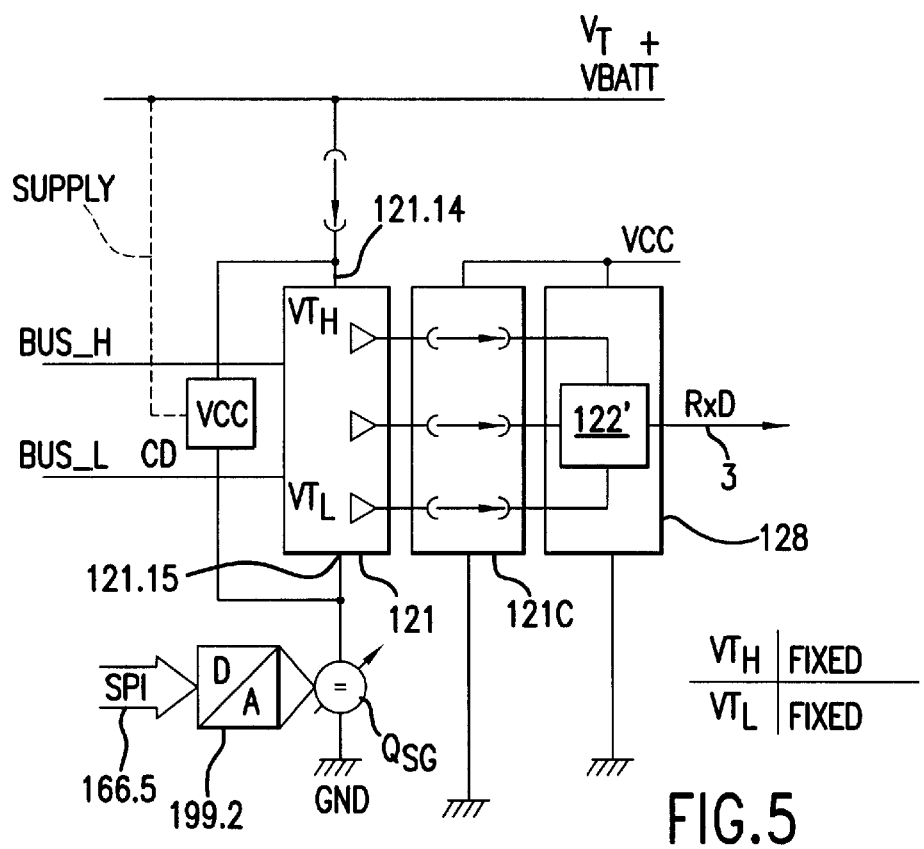
FIG. 5 shows a block diagram of elements of a receiving part of a subscriber (similar to WO97/36399, FIG. 36 therein)

According to FIG. 5, it is also possible, however, for only the discrimination part 121.20, which operates in an analog fashion, to be constructed in the receiving part of a transceiver by means of a base point offset source $Q_{SG}$ in a fashion capable of displacement with respect to earth potential, it being possible for the internal threshold voltages $VT_H$ and $VT_L$ (compare FIG. 6, bottom) for monitoring the voltage levels on the two bus lines BUS_H and BUS_L inside the receiving block to be prescribed invariable quantities.

Figure 6:
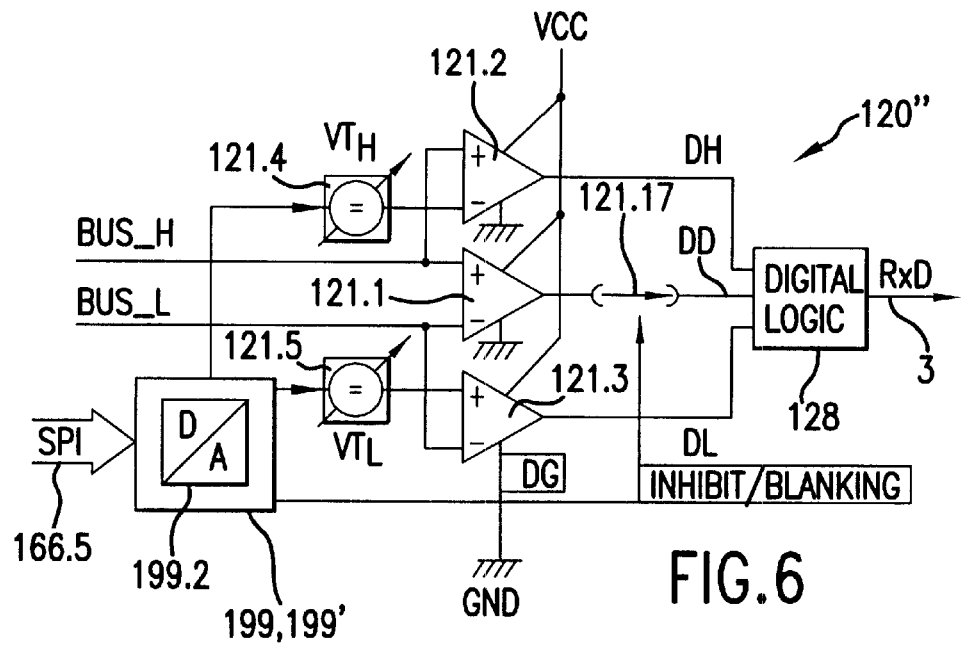
FIG. 6 shows a further block diagram of elements of a receiving part of a transceiver of a subscriber (similar to WO97/36399, FIG. 35 therein)

In the device example according to FIG. 6, the negative supply terminal DG of the analog structure, comprising the three comparators 121.1 to 121.3, for example, in the receiving part of a bus transceiver is connected to earth GND and thus has, for example, the potential of the chip GND inside a corresponding semiconductor circuit. The threshold value sources 121.4 and 121.5 for the comparators 121.2 and 121.3, which sources generate the threshold voltages $VT_H$ and $VT_L$, respectively, for the latter, are here adjusted and underpinned with an offset, in accordance with test requirements. Normally, the voltage levels of the two bus lines BUS_H and BUS_L are discriminated in receiving operation with respect to these threshold voltages. For reference-earth potential tests of interest here, the digital path 121.17, normally used for receiving purposes, between the comparator 121.1 and the evaluation logic circuit 128 can be interrupted if required.

It goes without saying that it is also possible to provide a similar, separate two-comparator structure outside a receiving part (which can then have fixed comparison thresholds) as a component, for example, of a testable bus transceiver. It can be combined with simple means for sampling the potential or the potentials of one or both bus lines, said sampling using concatenations of data signals, it then being the case that optionally the dominant or the recessive signal level can be detected, depending on the selection of the concatenation edge. In a way similar to that illustrated further below in connection with FIG. 8, in this case the sampling interval is selected to be shorter than the bus bit time, and the sampling interval is preferably placed in the final section of the bus bit time. As a result, measuring errors due to overshooting and/or decay oscillations on the bit signal shoulder can largely be blanked out. In a manner known per se, the actual sampling can be carried out arbitrarily—for example also by means of A/D microcontroller reading at high speed. More on this is set forth and described in detail in the application PCT/EP97/01534 submitted at the same time, and so reference is made to that disclosure for such details.

Figure 7:
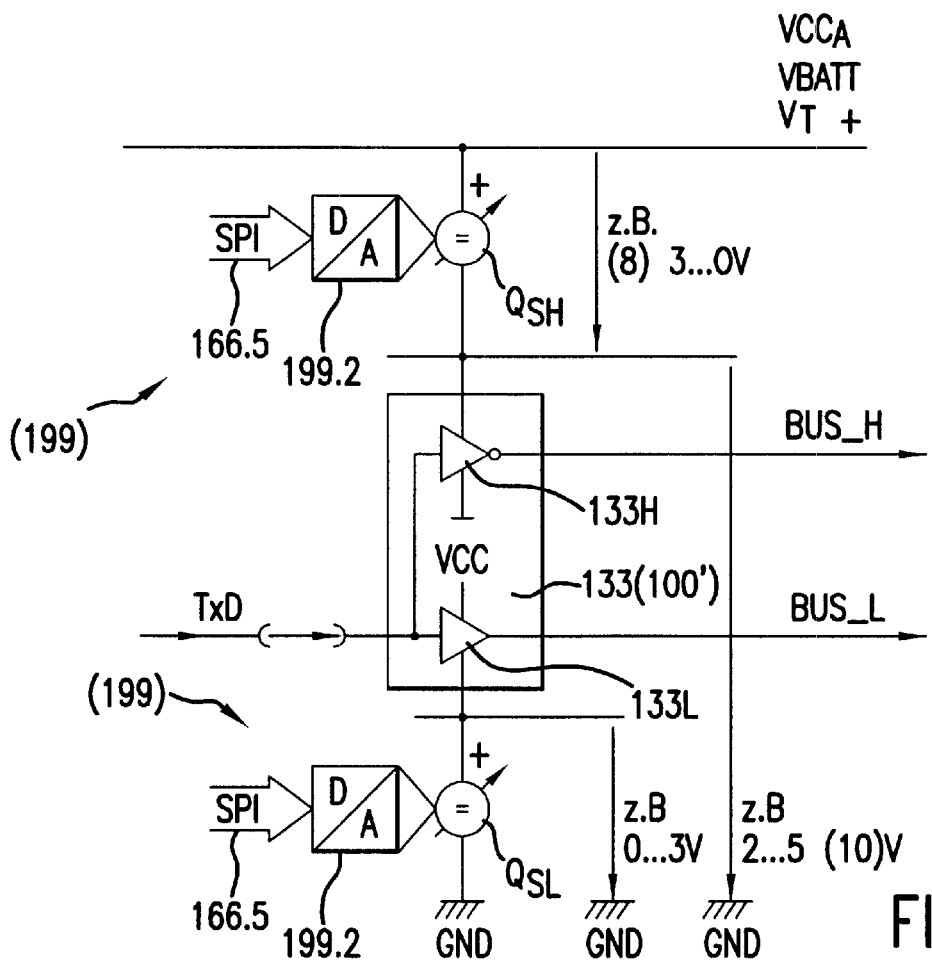
FIG. 7 shows a block diagram of device elements of a transmitting part of a transceiver of a subscriber (similar to WO97/36399, FIG. 15 therein)

By contrast with FIG. 3, in the case of the modification according to FIG. 7, two separate, controllable offset voltage sources $Q_{SL}$ and $Q_{SH}$ are provided for tests which optionally have one dominant voltage level or two, the source $Q_{SL}$ corresponding to that of FIG. 3, which is also effective with respect to the transmitting output stage 133. In order to raise the negative supply potential of the wire output stage 133L, the additional source $Q_{SH}$ is connected so as to permit the positive supply potential VCC or VBATT or $V_T$ of the wire output stage 133H to be changed in a fashion which can be controlled in an appropriately digital way. Thus, here the two source levels feeding onto the bus are variable, specifically the L source level is variable independently of the H source level, and vice versa.

It is possible, for example, for the controllable offset source $Q_{SL}$ to cover a voltage range of 0 to 3 volts, and for the controllable offset source $Q_{SH}$ to cover one of 8 or 3 to 0 volts. Depending on how high the supply potential of the offset source $Q_{SH}$ is, it is therefore possible with this device for the dominant L source level to be adjusted to 0 to 3 volts, and for the dominant H source level to be adjusted to 3 or 8 to 0 volts. In practice, the two offset sources $Q_{SL}$ and $Q_{SH}$ can be used both alternatively and simultaneously and independently of one another.

Figure 8:
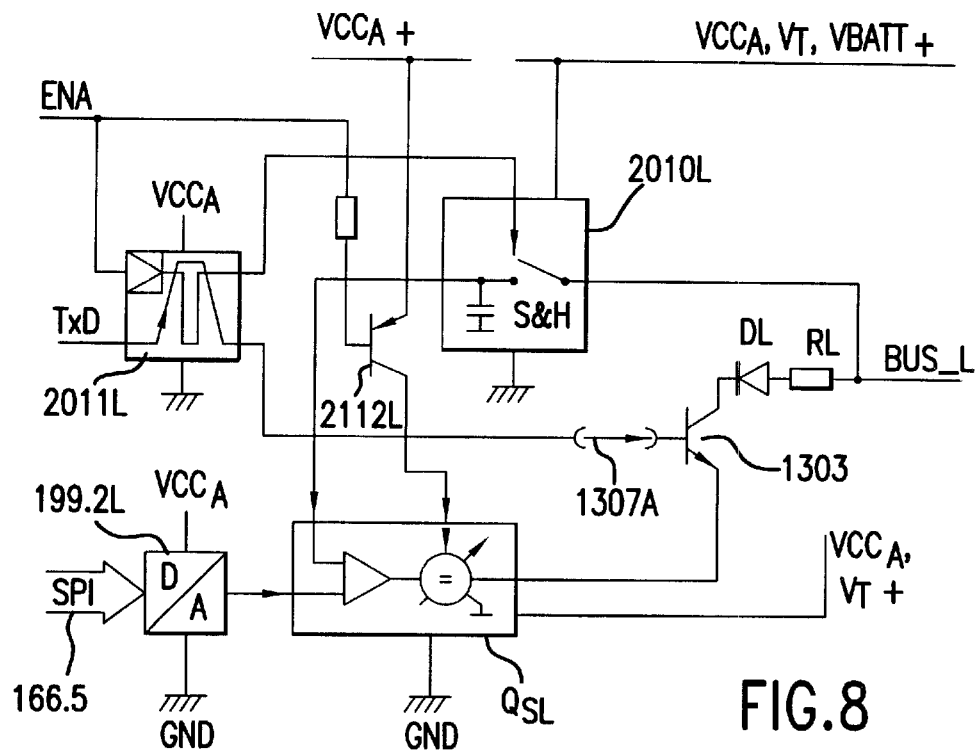
FIG. 8 shows a function diagram of a device which permits the bus wire BUS_L to be keyed at the transmitting end to a keying potential which is to be impressed in a dominant fashion (similar to WO97/36399, FIG. 25 therein)

The device detail according to FIG. 8 likewise permits a dominant potential stipulation, for example onto the bus wire BUS_L. Only essential elements are represented in a possible exemplary design. In particular, elements are omitted which prevent direct control implemented here of the source potential if, for example, there are potential conditions which do not allow a bus wire under offset to be energized. An essential element is a sample and hold circuit 2010L connected between supply terminals GND and, for example, $V_T$ or VBATT. It has an input connected directly to the bus wire BUS_L, for example. Also provided is a pulse-triggering circuit 2011L, which is preferably edge-triggered by the data signal TxD and which generates a very short sampling pulse SP, which follows the arrowed clock edge within the data bit time and is directed here to GND, for example. In addition to the sampler on the input side, the sample and hold circuit 2010L also comprises, for example, a holding element and, if required, also a state of the art impedance conversion means on the output side. The transistor 1303 is already switched on by the respectively effective active edge of the data signal TxD, when the sampling pulse is triggered (positive masking). A short time later, at the instant of sampling via the conducting transistor 1303, this measure closes the control circuit from the output of the controllable offset source $Q_{SL}$ via the output stage transistor 1303 as well as the diode DL and the protective resistor RL up to the input of the sample and hold circuit. The sampled variable output by the sample and hold circuit 2010L, and the stipulated set point of the D/A convertor 199.2L are fed via connections to the offset source $Q_{SL}$ for the purpose of adjusting it. By means of an ENA or NENA signal at the activation input of the pulse-triggering circuit 2011L and a deactivation input of the offset source $Q_{SL}$, the latter can be driven for the purpose of short circuiting to earth GND and the generation of sampling pulses can be blocked in 2011L. The affected offset source $Q_{SL}$ is then not active in this state.

The device elements described above, and those described in application PCT/EP97/01534, filed at the same time, are suitable for permitting the method described here to be carried out.

Figure 9:
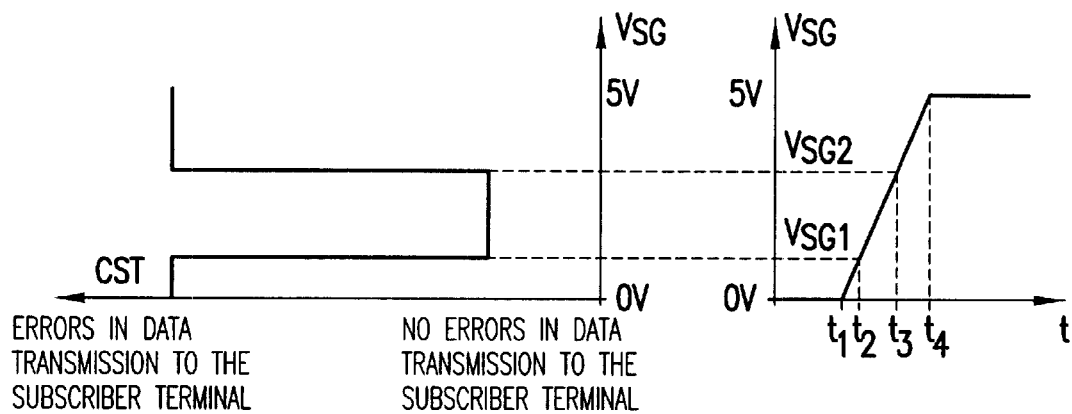
FIG. 9 shows a diagram illustrating the receiving ability of a bus subscriber against a ramp-shaped potential displacement in the course of an exemplary execution of the method (similar to WO97/36399, FIG. 7 therein)

FIG. 9 illustrates the communication status CST of the data transmission to a bus subscriber, which has an earth fault here, for example. In this case, the right-hand part of the diagram represents a simulation voltage $V_{SG}$ rising in the shape of a ramp between time marks $t_2$ and $t_4$ and which is generated, for example, by the simulation module 199A in FIG. 2, and the left-hand part of the diagram represents the window produced between the time marks $t_2$ and $t_4$ and inside which it is possible for data to be transmitted to the bus subscriber or receiver in the latter, which has an earth fault. In this case, the simulation voltage $V_{SG1}$ is reached at time $t_1$, and the simulation voltage $V_{SG2}$ is reached at time $t_2$. It may be seen at once from this representation that an evaluation within a system can be very substantially simplified if, for example, instead of a simulation voltage with a ramp-shaped characteristic use is made of a quantized characteristic, that is to say one which is stepped over time, that is to say if a possible offset voltage value corresponds in a network-wide fashion to each stage from a fixed number of stages.

It is also possible to use this representation to show that with an initial stipulation in a transmitter situated on the bus of a very high simulation voltage $V_{SG}$ and subsequent reduction of the latter, the bus subscriber which is the first to reach receiving ability is that sought, possibly being with the largest reference-earth potential error with respect to earth in the network—otherwise assuming acceptable functioning of the receiver.

Conversely, given an initial stipulation in a transmitter situated on the bus of no or a very low simulation voltage $V_{SG}$ and a subsequent increase in the latter, the bus subscriber which is the last to reach receiving ability after all the others is that possibly being sought with the largest reference-earth potential error with respect to earth REM GND in the network, compare also FIG. 2.

Conversely, the representation according to FIG. 9 can also be read for the case in which, for example, a transmitting subscriber, for example in the case of a full operating load, has a base point offset voltage $V_{FG}$, and a corresponding simulation module generates a compensating simulation voltage $V_{SG}$ which displaces at least one voltage level, which is to be discriminated for the sake of reception, in the error voltage direction.

Assuming that all the receivers in the network have, at least with respect to their reference-earth potential bar SYS GND in said subscriber (within system-specific tolerance limits), correct threshold values for receiving messages in whatever way, it follows therefrom that given a monotonic change in the simulation voltage $V_{SG}$ in the case of a transmitter and, in this case, constant load conditions on the bus or on the bus wire under test, it is possible to use the sequence of the achievement or loss of receiving ability of bus subscribers to reach a conclusion on the relative levels of the offset in relation to the reference-earth potential REM GND for these bus subscribers. This holds universally under both single-wire and two-wire test conditions.

As may be read off directly in the light of the above from FIG. 2, seen from the bus BUS_H, BUS_L it is of no importance in each case in which way the receiver and/or transmitter of the transceiver 100, 100' or its discriminant receiving threshold values or dominant source level(s) are raised in terms of their potential, or how its/their operating levels active with respect to the bus are falsified.

The same also holds, mutatis mutandis for the recessive levels. With regard to potential errors, it is therefore already sufficient for the method according to the invention to influence in terms of offset with reference to a potential which can be drawn in a network-wide fashion (REFerence GRounD) only those parts in the receiver or transmitter of the transceiver 100, 100' of a subscriber which, seen from the bus, determine the with respect to REF GND effectively active receiving threshold values or, in the case of transmission, dominant source levels.

Figure 10:
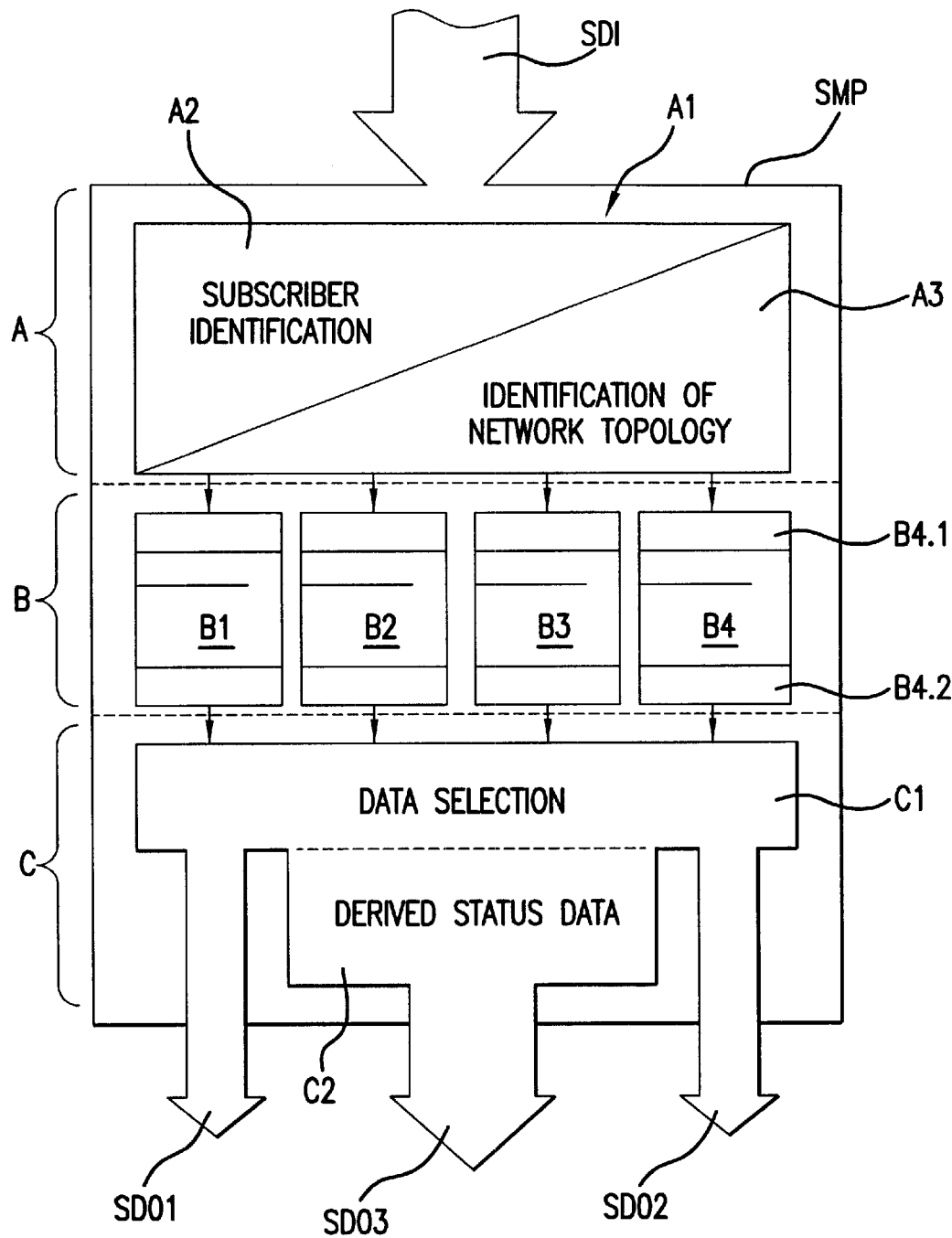
FIG. 10 shows a diagrammatic illustration of the exemplary structure of a status map.

A status map with an exemplary, relatively simple structure is illustrated in FIG. 10. This structure can, however, also be of different design, depending on the features of a network and its operational particularities and specific error probabilities.

In the simplest case, the status map in the meaning of the invention is a memory area which preferably contains a list of the subscribers of the system and in which status data on the signal criteria of the subscribers ECU1 to ECU8 which are important for communication are stored. However, a status map is generally understood within the scope of the invention as going beyond this purely physical minimum embodiment. For example, its concept can also comprise memory-supporting auxiliary switching means and elements of at least one computer program, which are required in order to change data—that is to say their contents—therein, to arrange data therein successively otherwise or, for example, to derive other data as appropriate from specific data by means of stipulated microprogramming. Such a derivation can be performed within the scope of the invention, for example, as a function of testing different subscribers with respect to a specific subscriber, that is to say, in the case of detecting a signal criterion with the participation of an additional subscriber or a plurality of additional subscribers as measurement witness(es), or in conjunction with a confirmation test operation between a plurality of subscribers and the status map with respect to one or more subscribers (witness operation or approval operation with the status map as approver). With this understanding, a status map in the meaning of the invention is therefore to be seen in conjunction with a computer as contained, for example, in each of the subscribers ECU1 to ECU8.

The status data are determined by discriminating, testing or checking or measuring by the system with respect to individual subscribers, and thus ultimately by the subscriber (s) itself/themselves. This is performed, for example, as appropriate by at least specific parts of the software for operating the networked system or under their complete control.

It is also possible that derived variables such as, for example, at least a measure of the margin of error and/or a trend variable with respect to a signal criterion (have been generated and) are stored in such a status map. A status map in the meaning of the invention in any case uniquely assigns subscribers and/or their position inside the topology of the network and characteristic signal criteria of subscribers or at the location of subscribers, which are subject to the possibility and/or risk of temporal change with the effect of impairing the network-wide communication between subscribers.

In this connection, the status map can also, in particular, produce assignments of this type which reach back into the past, resulting in the possibility of making statements on causes of occurrences and/or duration of an occurrence and/or the degree of an error probability (for example measure of the margin of error too low) or the latency of error (for example two-wire operation still possible, whereas one-wire operation would already no longer be possible if required). Further properties of the status map follow from the introduction of the description reflecting the claims; as mentioned above, they are in no way limited to the treatment of reference-earth potential errors, or bound in a restrictive way to the manner in which signal criteria are discriminated, tested and checked or measured in the system.

For this purpose, the status map SMP according to FIG. 10 is divided by way of example into an identification section A, a data stack B and a data processing section C. This subdivision proves to be expedient in very many cases independently of the fine structure. Here, by way of example, the identification section A contains a table A1 which can be used to assign each system identifier and/or each subscriber in the system as required with its topological identification or a topological identifier within the network. For this purpose, a field A2 "subscriber identification" is here assigned the field A3 "identification of network topology", for example.

The data manipulated by the identification section A can be fed to the data stack B. Here, the data stack B has four register stacks B1 to B4 for four signal criteria. Situated in the uppermost stack register B4.1 are the data of the most recent, fourth signal criterion, and in the lowermost stack register B4.2 the data of the oldest fourth signal criterion for the individual subscribers of the system. This organization according to signal criteria can offer advantages with regard to subsequent expansions of the networked system by further subscribers. The four register stacks B1 to B4 can be designed with optional access, as FIFOs or LIFOs, depending on the operating software and fine structure of the cooperative computer environment. Data from the register stacks B1 to B4 can be fed to the data processing section C. Here, this section comprises, for example, only a data selection field C1 and a processing field C2. The latter serves to derive data, for example of trend variables, but also of, for example, alarm flags. Such an alarm flag can be used, for example in FIG. 1, starting from the status map MP1, to trigger the signalling element AD of the subscriber ECU7 via the bus.

Data can be held in the map in a volatile or non-volatile fashion, both also in a partially differing fashion. In the case of non-volatile storage, for example of Table A1, the latter must be loaded in each case when commissioning the system. The status map SMP is fed via its entry path SDI, which serves the purpose of possibly supplying data to the status map. Status data characterizing signal criteria can be extracted from the map in a selected fashion via status paths SDO1 and SDO2. Derived data relating to signal criteria in the system or from subscribers can preferably be extracted from the map via a special status path SDO3.

For example, the test instrument ETU in FIG. 1 can read out selected data via SDO1 and/or SDO2 via the bus, for the purpose of its own processing. This can be expedient if this is a workshop instrument with an extensive test program. It is also possible, nevertheless, to make such reading out dependent on the fact that derived data of a specific type, or, for example, specific flags which have, for example, been put in section C2 because of a trend-evaluating overshooting of limiting values can be read out via SDO3 of the status map. This can be expedient if the test instrument ETU is, for example, a small mobile tester which only if required writes to a data carrier for further processing in a larger workshop apparatus.

The list A1 can, for example, also be replaced by an input-side multiplexer which services the data stack B on the output side in an appropriately multi-channel fashion, for example in accordance with the number of signal criteria to be monitored. Since, however, impairments to communication in a network have quite different effects as a rule at different locations in the network, such a list offers, in many instances, advantages as follows. If required, this list can be used to assign signal criteria to communication nodes in the net in a topological fashion, that is to say specific locations on the system carrier. On the occasion of the breaking of a specific measure of the margin of error of a signal criterion with respect to a specific subscriber, this assignment serves the ability of a status map, in conjunction with the software operating it, also to include preferentially or more intensely in the checking other subscribers in the topological vicinity specific to the cause or error (that is to say, in the example selected here of potential errors, for example, the earth supply of a plurality of subscribers from one and the same terminal, that is to say location).

As a result, it is possible while the ability to communicate still exists to make an early determination of the circle of subscribers at risk of communication faults, and from this to derive the type and urgency, for example, of a service request via the display element AD. In the case when the ability to communicate has already been limited or disturbed, the status data described in the map until immediately there before can be used to delimit the probable cause of error on the system carrier and the location thereof quickly and simply and to read them out, for example by means of a test instrument ETU according to FIG. 1.

Figure 11:
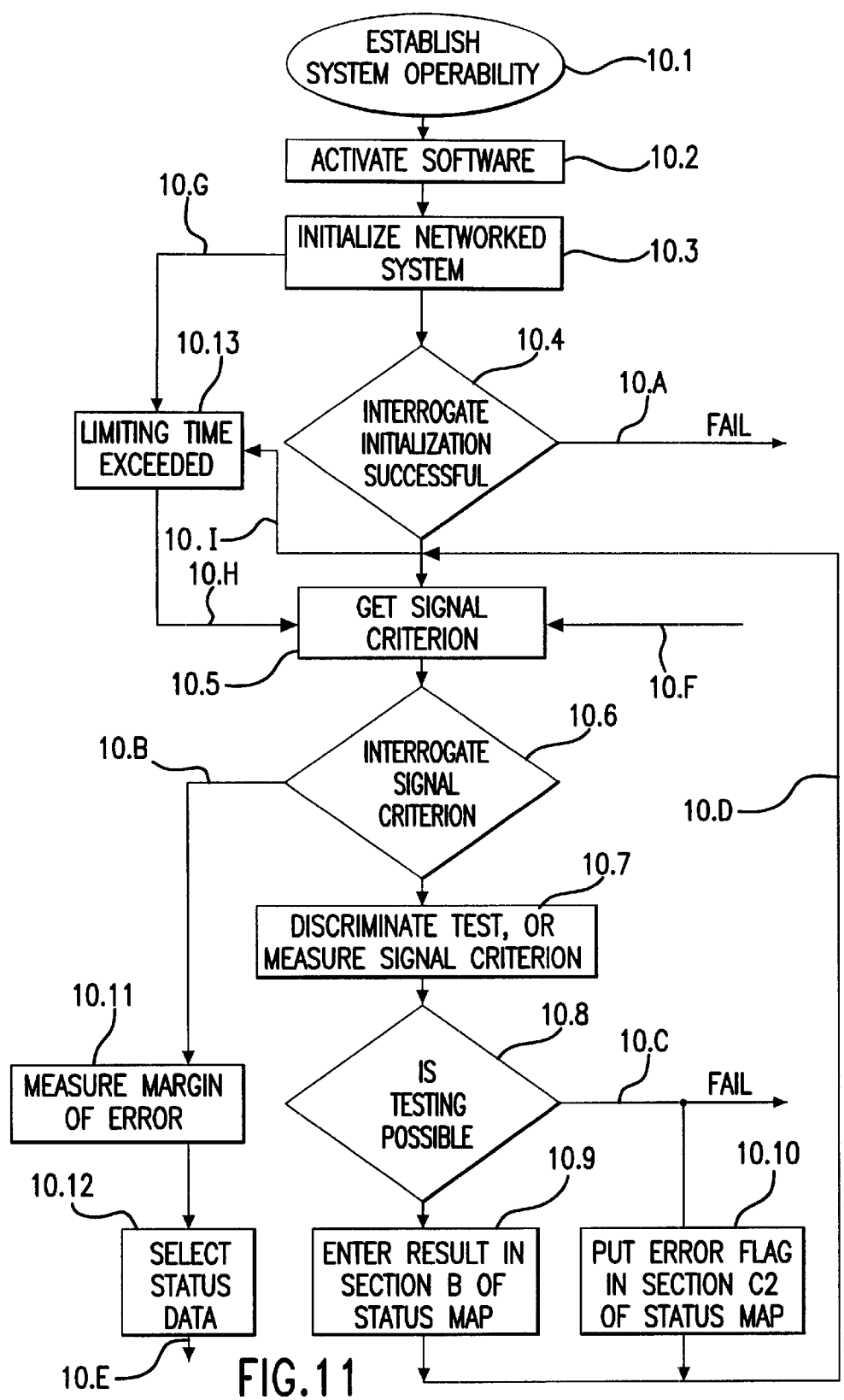
FIG. 11 shows a flowchart for carrying out the method according to a first exemplary embodiment.

FIG. 11 illustrates in a flowchart representation the method according to the first claim, the minimum version as mentioned in the introduction of the description not being represented, but a few exemplary extensions of an optional nature being addressed. In this case, it is assumed by way of example for clarity that all the subscribers in the networked system are tested with respect to all the signal criteria.

The operability of the system is established in step 10.1, for example by energizing and thereby starting it. The software for testing and safeguarding the availability of the networked system is activated in step 10.2. To the extent that the software is integrated in the software for operating the network, the activation is performed in the course of activating the software for operating the networked system. In this case, the networked system is initialized in step 10.3. As early as in this connection, all the subscribers can firstly be controlled to defined operating states in a network-wide fashion. The next step 10.4 interrogates whether the initialization of the networked system has been successfully concluded. If this was not possible because of an error, an error-on-startup treatment (FAIL) is performed via the path 10.A. If it has been possible for the initialization to be successfully concluded, data describing the next (that is to say, at the moment the first) subscriber to be tested and/or the next (that is to say, at the moment the first) signal criterion to be tested are fetched from the status map in step 10.5.

It is possible in step 10.6 to interrogate these data as to whether the test currently to be carried out relates to a subscriber already tested (specifically, the first) and/or a signal criterion already tested (specifically, the first). If this is the case, a branch 10.B is made to step 10.11, which is described further below. If this is not the case, the current signal criterion is discriminated or tested or measured with reference to the currently selected subscriber in step 10.7. Thereafter, interrogation is made in step 10.8 as to whether testing is possible and/or the result was fundamentally plausible. If this is not the case, an—at least latent—communication error is already present, and it is possible via the branch 10.C, for example, on the one hand to make a test-fail display associated with a subscriber and/or signal criterion, that is to say, for example AD in ECU7 in FIG. 1, and on the other hand, in step 10.10, to put an appropriate error flag in section C2 of the status map (derived status data). However, if this is the case, in step 10.9 the result of discriminating or testing or measuring is entered in data form into the relevant register stack (B1 . . . B4) in section B of the status map. Both after step 10.9 and after step 10.10 there is a return to before step 10.5, whereupon the next subcycle begins with the next subscriber and/or signal criterion.

If, finally, the branch 10.B already mentioned above is reached, in step 10.11 at least one measure of the margin of error of the networked system is determined with respect to at least one tested signal criterion. In the concluding step 10.12, it is possible optionally either to select status data from the map in section C1 of the status map for the purpose of interrogation, and/or to undertake the "displacement" (that is to say, for example, ageing of data by reorganization) of current data into older data for the purpose of preparing the next cycle, or for them to be prepared for execution in the next test pass initiated. The test routine described is stopped via output 10.E. The status map can then revert, for example, into a standby mode, until the next test cycle is begun with activation of step 10.5 at the input 10.F by the software for operating the networked system.

Furthermore, illustrated here as an option is a further step 10.13, which is triggered from step 10.3 via 10.G. The step 10.3 is as follows. The networked system is initialized in step 10.3. The initialization is concluded, for example, in the normal case after a specific limiting time. It can be tested via path 10.I in step 10.13 whether with respect to the initialization performed the limiting time provided therefore has been exceeded. This cannot be excluded in a system-specific fashion, for example, as a consequence of a known condition which makes it look expedient firstly to start by testing a specific signal criterion with respect to a subscriber or, conversely, a specific subscriber with respect to a signal criterion. An appropriately specific selection is made via 10.H, for example, by masking subscribers or signal criteria which are undesired in that respect in the status map for the first subcycle. Since the initialization signal via 10.G is already lacking after the first subcycle, 10.D–11.I then remains without effect, which means that said mask is cleared and step 10.5 is then subsequently executed as described above.

It has been assumed up to this point that all the subscribers in the networked system are tested with respect to all signal criteria. This can be sensible in many instances and, in any case, after switching on the system. However, departure can be made therefrom in a simple way simply by overwriting the functional content of specific steps while observing the flowchart according to FIG. 11. Thus, for example, steps 10.5 and 10.13 can be overwritten to the effect that it is always only the next subscriber to be tested which is fetched from the status map in step 10.5, while step 10.13 is occupied by the function of a signal criterion counter which, in each case after counting the subscribers via 10.D and 10.I, on stipulation from the status map, stipulates the next signal criterion to be tested via 10.H. It goes without saying that in the course of the same stipulation from the status map it is also possible for any desired limitation to be placed on only specific subscribers. If, furthermore, the functional content of steps 10.11 and 10.12, for example, is overwritten to the effect that the measure of the margin of error with respect to the signal criterion currently being tested is formed with respect to all the tested subscribers in step 10.11, and in step 10.12 that subscriber is marked whose measure of the margin of error was smallest, then the method according to claim 6 is implemented, for example.

Figures 12A, 12B:
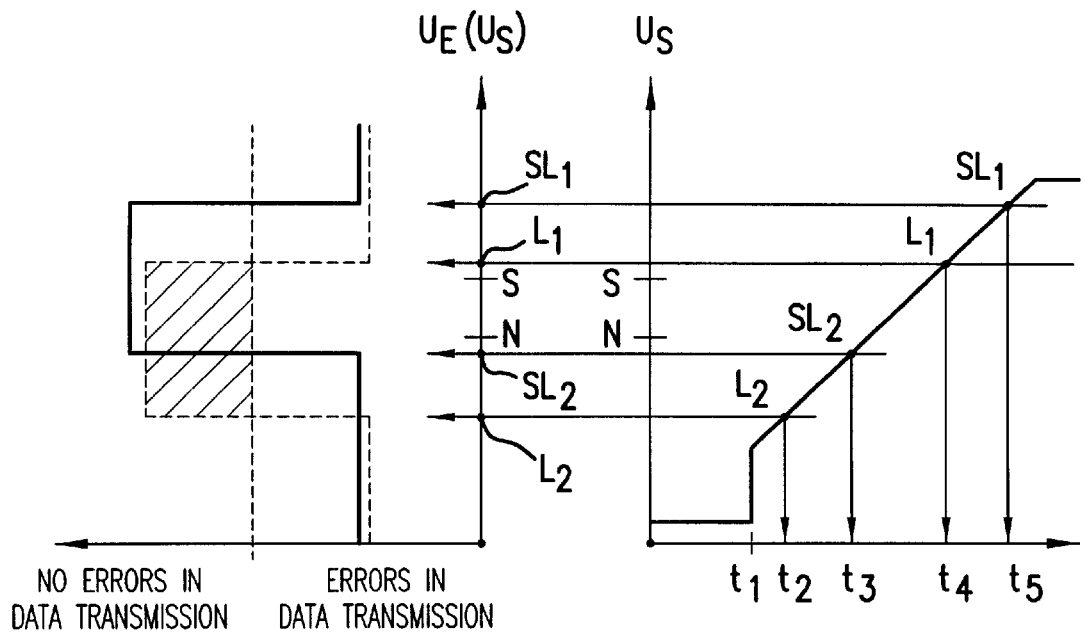
FIG. 12a shows an illustration of the window of error-free data transmission when, for the purpose of testing a receiving subscriber, a transmitting subscriber changes a transmit voltage level.
FIG. 12b shows the characteristic of a voltage level of a transmitting subscriber in the case of potential testing of the receiving ability of another subscriber.
Figure 13:
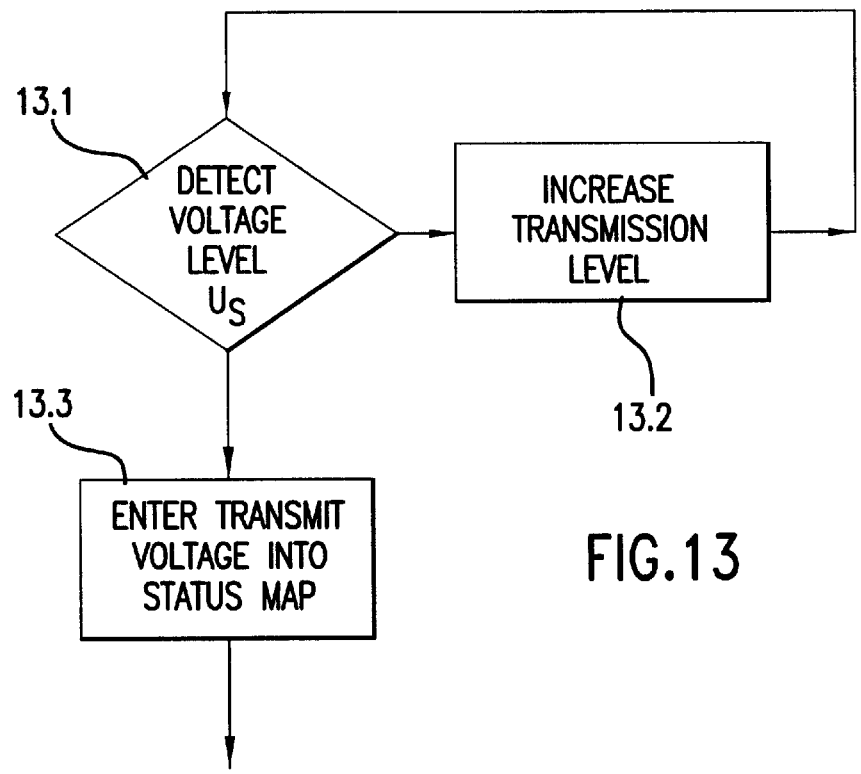
FIG. 13 shows a diagram for the purpose of illustrating the method sequence for storing a displacement of the "receiving window" in accordance with FIGS. 12a and 12b in the status map.

FIG. 12*a*, FIG. 12*b* and FIG. 13 illustrate a modified method according to claim 2 for the selected special case of testing for reference-earth potential errors.

In this case, FIG. 12*a* illustrates the window of data transmission without errors when a transmitting subscriber changes a transmit voltage level for the purpose of testing a receiving subscriber.

In this case, "N" denotes the set point of a voltage level which is normally transmitted onto the bus by the data-transmitting subscriber and is detected by the receiving subscriber in the case of interference-free operation of the data transmission. "$L_1$" and "$L_2$" denote the tolerance limits within which a voltage value occurring is still to be detected by the receiving subscriber in the case of data transmission.

Furthermore, a further voltage level "S", which is displaced upwards, is also denoted, as are limiting values "$SL_1$" and "$SL_2$", which are likewise displaced and correspond therewith. Such a relatively high voltage level "S" of a transmitting subscriber is detected by a receiving subscriber, for example as a voltage level corresponding to at least the normal tolerance value "$L_2$", whenever the reference-earth potential of the receiving subscriber is correspondingly displaced upwards. As indicated above, this can occur, for example, because of defective earth contact.

FIG. 12*b* illustrates for the case of reception an exemplary voltage characteristic $U_S$ of a data-transmitting subscriber with reference to checking a subscriber suspected of potential errors. At the instant $t_2$, a voltage level corresponding to the voltage value "$L_2$" is applied to the line/lines. Since, however, in the represented exemplary embodiment, the data-receiving subscriber requires a relatively high voltage level "$SL_2$" in order—because of its defective earth contact—to infer the truth status normally associated with the voltage level "N", the receiving subscriber cannot yet detect at the instant $t_2$ that data are being transmitted.

It is shown in the further course that the data-transmitting subscriber increases its transmitting level $U_S$ which is to be associated with this truth status. In the exemplary embodiment shown, the level is increased continuously. This increase can, however, also be made in another way, for example in more or less small steps.

When the transmitting level Us reaches the limiting value "$SL_2$", the receiving subscriber infers the truth status normally assigned to the normal transmitting level "N". A further rise in the transmitting level can then be omitted, because the displacement of the receiving-end reference-earth potential has already been found for the one subscriber under consideration with the determination of the lower limiting value $SL_2$ from the difference from the set point $L_2$.

On the other hand, it is easy to detect from a multiplicity of subscribers those having the largest potential error by further increasing the transmitting level Us until it is possible in the period between $t_4$ and $t_5$ for only the subscriber with the largest potential error to receive data, and at the instant $t_5$ said subscriber is then the last to become incapable of receiving when $U_S$ has risen upto $SL_1$. Appropriate values are then stored in the status map for further evaluation and held available there.

An exemplary embodiment of a method is represented in FIG. 13.

In step 13.1, it is firstly checked whether the receiving subscriber detects/has detected a voltage level $U_S$ which corresponds at least to the value "$L_2$". If this is not the case, there is a transition to step 13.2, in which the transmitting level of the transmitting subscriber is increased by a certain absolute value. A return is made to step 13.1 subsequent thereto. When the receiving subscriber detects/has detected in step 13.1 a voltage level $U_S$ greater than or equal to "$L_2$", there is a transition to step 13.3, in which there is made into the status map a data entry which represents the transmit voltage level last required for this detection.

Figures 14A, 14B:
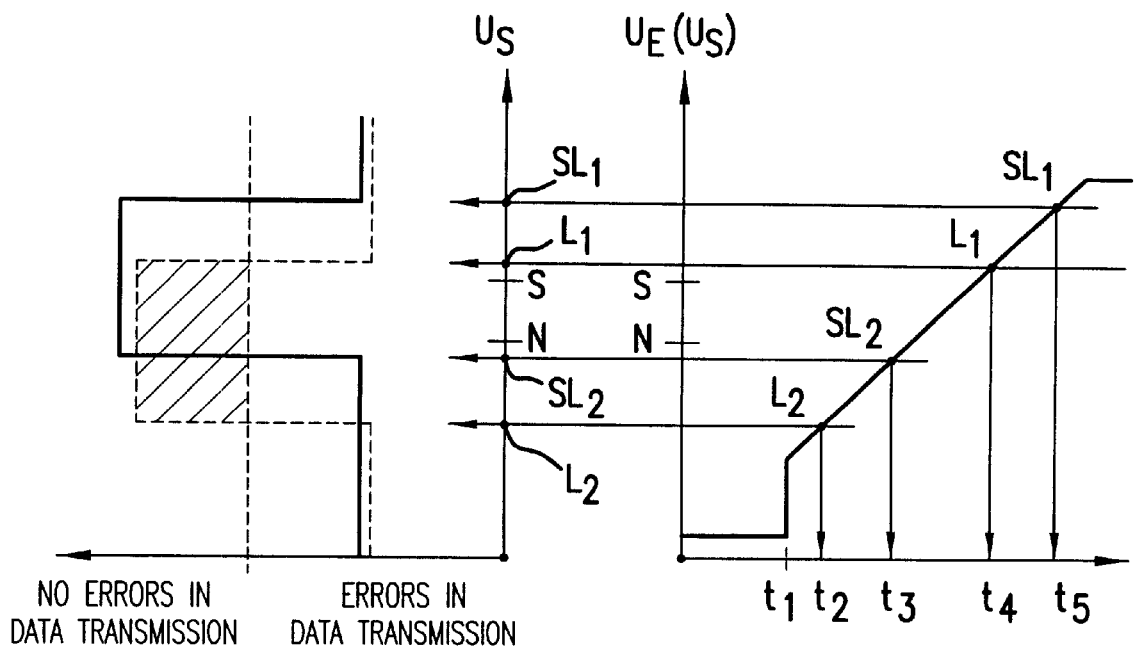
FIG. 14a shows an illustration of the window of error-free data transmission when, for the purpose of testing a transmitting subscriber, a receiving subscriber changes a discriminant reference voltage level.
FIG. 14b shows the characteristic of a discriminant reference voltage level of a receiving subscriber in the case of potential testing of the transmitting ability of another subscriber.
Figure 15:
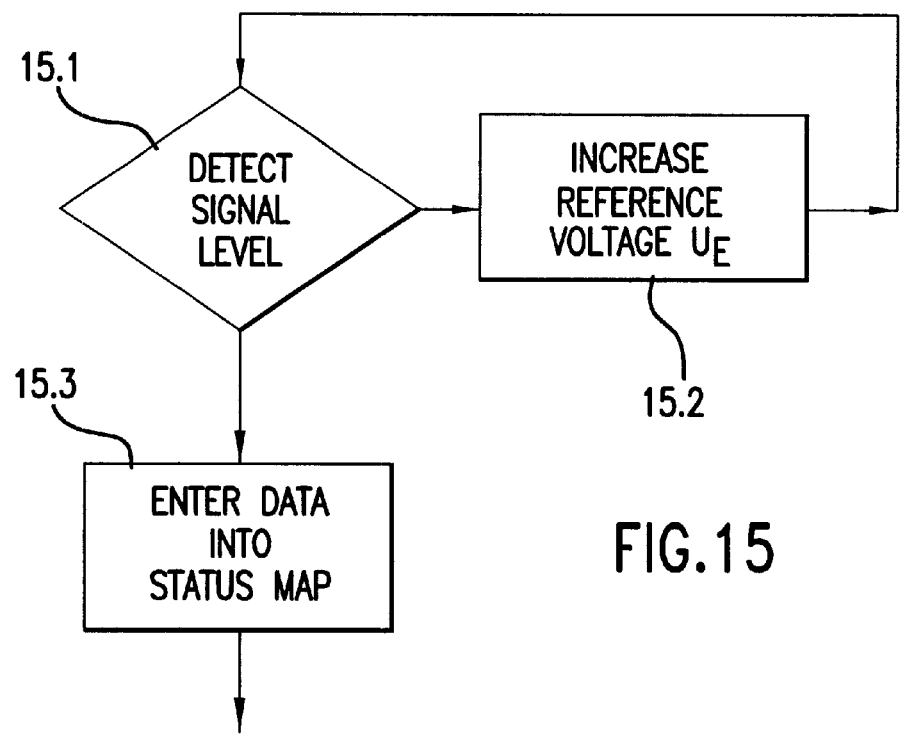
FIG. 15 shows a diagram for the purpose of illustrating the method sequence for storing a displacement of the "transmitting window" in accordance with FIGS. 14a and 14b in the status map.

FIG. 14*a*, FIG. 14*b* and FIG. 15 illustrate a modified method according to claim 3 for the selected special case of testing for reference-earth potential errors.

In this case, FIG. 14*a* illustrates the window of data transmission without errors when a receiving subscriber changes a discriminant reference-earth voltage level for the purpose of testing a transmitting subscriber.

In this case, "N" denotes the set point of a voltage level which is normally, in the case of operation without interference, transmitted onto the bus by the data-transmitting subscriber and is detected by the receiving subscriber in the case of interference-free operation of the data transmission. "$L_1$" and "$L_2$" denote the tolerance limits within which voltage values occurring are still to be detected by the receiving subscriber in the case of data transmission.

Furthermore, a further voltage level "S", which is displaced upwards, is also denoted, as are limiting values "$SL_1$" and "$SL_2$", which are likewise displaced and correspond therewith. Such a relatively high voltage level "S" of a transmitting subscriber is transmitted whenever the reference-earth potential of the data transmitter is correspondingly displaced upwards. As indicated above, this can occur, for example, because of defective earth contact.

Since, however, in the represented exemplary embodiment, the data-receiving subscriber requires a relatively high discriminant reference-earth voltage corresponding to the limiting value "$SL_2$", in order—because of the defective earth contact of the transmitting subscriber—to infer the truth status normally associated with the voltage level "N", the receiving subscriber cannot yet detect at the instant $t_2$ that data are being transmitted. At the instant $t_2$, the receiving subscriber begins to monitor with a discriminant reference-earth voltage according to the lower limiting value $L_2$ whether it can detect data.

FIG. 14b illustrates an exemplary characteristic of a discriminant reference-earth voltage $U_E$ of a data-receiving subscriber with reference to checking a subscriber suspected of potential errors in the case of transmission. The voltage $U_E$ is varied in this case. At the instant $t_2$, the transmitting subscriber applies its transmitting level to the line/lines, it being the case, however, that the receiving subscriber still cannot detect data, because of an existing reference-earth potential error in the transmitting subscriber.

In what follows, the reception-discriminant reference-earth voltage $U_E$ is increased in the receiving subscriber to the value "$SL_2$" at which the transmission of data is detected. In the exemplary embodiment shown, the reference level which is discriminant at the receiving end is increased continuously. This increase can, however, also be made in another way, for example in more or less small steps.

When the reference level $U_E$ which is discriminant at the receiving end has reached the limiting value "$SL_2$", the receiving subscriber infers the truth status normally assigned to the normal transmitting level "N". A further rise in the reference level $U_E$ which is discriminant at the receiving end can then be omitted as a rule, because the displacement of the receiving-end reference-earth potential has already been found with the determination of the lower limiting value $SL_2$ from the difference from the set point $L_2$.

On the other hand, it is easy to detect from a multiplicity of transmitting subscribers that having the largest potential error by further increasing the reference level $U_E$ which is discriminant at the receiving end until it is possible in the period between $t_4$ and $t_5$ for only the subscriber with the largest potential error to receive, until at the instant $t_5$ said subscriber can likewise no longer receive when $U_E$ has risen upto $SL_1$. Appropriate values are then stored in the status map for further evaluation and held available there.

An exemplary embodiment of a method is represented in FIG. 15.

In the step 15.1, it is firstly checked whether the receiving subscriber detects a signal level which corresponds at least to the value "$L_2$". If this is not the case, there is a transition to step 15.2, in which by increasing a discriminant reference-earth voltage $U_E$ the response voltage threshold of the receiver thereof is increased. A return is made to step 15.1 subsequent thereto. When the receiving subscriber detects/has detected in the step 15.1 a voltage level greater than or equal to "$L_2$", there is a transition to step 15.3, in which there is made into the status map a data entry which represents the receiving-end discriminant reference level last required for this detection.

Figure 16:
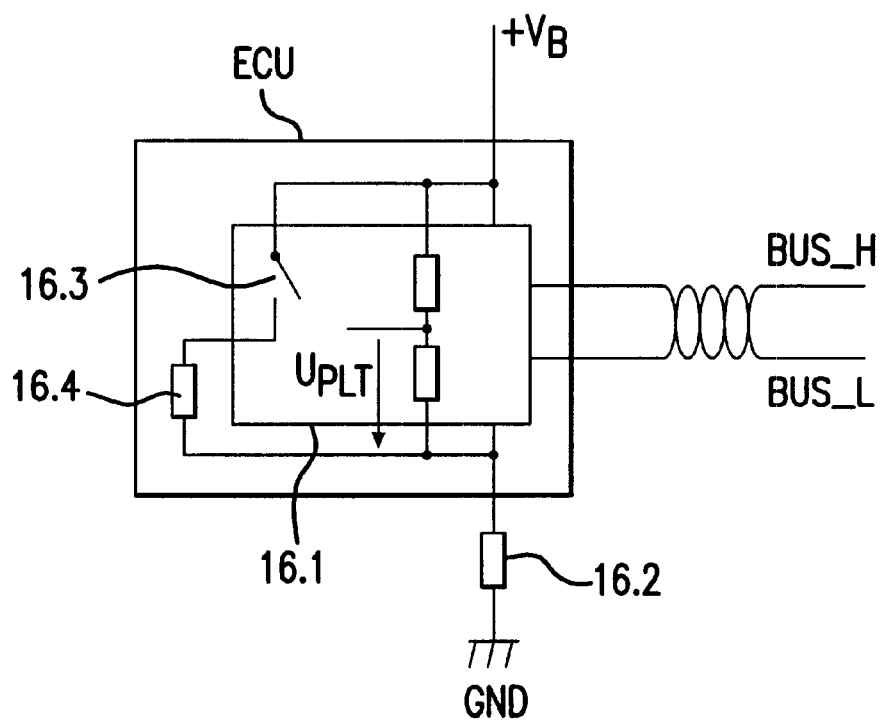
FIG. 16 shows a block diagram of a system subscriber which contains means for controllably energizing its ground-side operating current terminal.

FIG. 16 illustrates how defined conditions can be produced for a subscriber in the special case of detecting reference-earth potential errors with respect to an equipotential bar GND with system-wide extent.

A system subscriber ECU contains an electronic system 16.1 which is connected to the bus BUS_H/BUS_L and supplied with operating current from a potential $+V_B$ against said equipotential bar GND. Present in the current path to the potential GND is a line resistance or transfer resistance which is to be monitored or to be tested and has the effect of offsetting a potential error with respect to the subscriber ECU via GND. One component of the electronic system 16.1 is a load switching element 16.3 via which, for example, a current consumer 16.4, for example a current source or a test load resistor, which is also a component of the subscriber ECU can be switched on for a short time via the bus BUS_H/BUS_L if requested. A current source can nonetheless be a controlled one which then contains the function of 16.3 and 16.4 in a quasi-integrated fashion. It is possible in this way to make an increased earthing current flow to the equipotential bar GND for the period in which the load switching element 16.3 is driven. A possible alternative to this is also the operational driving of an external working load supplied with current by the subscriber ECU towards earth GND. Since a current flow effected in this way to the equipotential bar GND (in the case of a lack of the property of a current source from the point of the current consumer, or of an external working load) can depend on the resistor 16.2, it can prove to be expedient in particular cases also to discriminate or to test or check or to measure the operating voltage present outside across the subscriber ECU, or a voltage derived therefrom, and to generate corresponding status data in this regard and store them in the at least one status map SMP and/or process and/or evaluate them. It is essential here that this voltage inside the subscriber ECU is not obtained from the potential $+V_B$ by regulation, since it cannot otherwise be used as reference-earth voltage for the purposes of evaluating plausibility in the status map.

The modes of procedure described above can be used to determine potential displacements of different subscribers of the networked system against one another. If the potential displacements of a plurality of subscribers are compared, it is possible thereby to make reliable statements on earthing error problems of individual subscribers. If, for example, a plurality of data receivers have a potential displacement with respect to a data transmitter, it is possible, for example, to conclude from the status map that the data transmitter has a potential displacement with respect to the data receivers, and not vice versa. A plurality of subscribers in the network can participate particularly advantageously with a witness function or approver function with regard to the status map for such determinations.

According to the description, the method according to the invention is also suitable for the early detection of errors which possibly impair communication within the networked system and to that extent then question the availability of the system. The or at least one status map is advantageously stored in a subscriber, or a plurality are managed or operated and/or stored in a plurality of subscribers of the networked system. The status map can advantageously be read out by a test instrument which can be connected to the networked system. It is then possible for errors in the process of being produced to be rectified at an early stage before malfunctions occur in the networked system.

With respect to developments of details of the method described above which are not illustrated in the figures, reference may be made to the description and explanation of the features in the detailed introduction to description and, for the sake of understanding, to the documents mentioned at the beginning.

What is claimed is:

1. A method for testing and safeguarding an availability of a networked system assigned to a system carrier, in which a multiplicity of subscribers exchange data via a bus-type network comprising one or more lines, at least individual subscribers transmitting data via at least one line when specific voltage levels are applied to the at least one line by appropriate subscribers, and the data being evaluated in at least one receiving subscriber using voltage levels based on a signal criterion wherein the at least one line is monitored by the at least one receiving subscriber for one of an overshoot or undershoot of the voltage levels, the method comprising the acts of:

performing one of discriminating, testing and measuring signals present on a bus-type network, during operation of the system, with respect to at least one signal criterion by individual subscribers in a network-wide manner for all subscribers;

generating respective characteristic status data for each at least one signal criterion with respect to each subscriber;

collecting and arranging the respective characteristic status data in at least one status map of the system, the status data characterizing both a current and at least one earlier status of tested subscribers, with respect to the at least one criterion; and obtaining at least one criterion from the characteristic status data, wherein a reference-earth potential of the individual subscribers in the networked system is one of discriminated, tested and measured as the at least one signal criterion.

2. The method according to claim 1, further comprising the acts of:

performing one of a discrimination and measurement in a subscriber of at least one dominant source level fed onto at least one line of a bus-type network to detect a reference-earth potential deviation for at least one receiving subscriber in the networked system;

offsetting at least one dominant source level onto at least one line of the bus-type network with respect to a normal dominant signal level in a predetermined manner; and storing respective offsets as status data in the at least one status map as a function of one of a discrimination result and measurement result obtained in the at least one receiving subscriber.

3. The method according to claim 2, further comprising the act of:

transmitting data signals having at least one dominant source level offset with respect to the normal dominant signal level into the bus-type network by at least one subscriber of the networked system.

4. The method according to claim 1, further comprising the act of:

holding, at least temporarily, status data characterizing at least one earlier system status and status data characterizing the current system status in the at least one status map.

5. A method for testing and safeguarding an availability of a networked system assigned to a system carrier, subscribers to the networked system exchanging data via at least one line, at least individual subscribers transmitting data via at least one line when specific voltage levels are applied to the at least one line by appropriate subscribers, and the data being evaluated by at least one subscriber utilizing voltage levels wherein the at least one line is monitored by the at least one subscriber for one of an overshoot and an undershoot of the voltage levels, the method comprising the acts of:

transmitting signals at a voltage level which is displaced in comparison to normally transmitted data to check an operability of data-receiving subscribers;

determining a displacement measure where at least individual subscribers can no longer receive data; and storing in at least one status map, with respect to the individual data-receiving subscribers, status data representing at which displacement measure of the voltage level at least individual subscribers can no longer receive data and/or at which further displacement measure of the voltage level at least one subscriber can still receive data.

6. The method according to claim 5, further comprising the act of:

holding, at least temporarily, status data characterizing at least one earlier system status and status data characterizing the current system status in the at least one status map.

7. A method for testing and safeguarding an availability of a networked system assigned to a system carrier, subscribers to the networked system exchanging data via at least one line, at least individual subscribers transmitting data via at least one line when specific voltage levels are applied to the at least one line by appropriate subscribers, and the data being evaluated by at least one subscriber utilizing voltage levels wherein the at least one line is monitored by the at least one subscriber for one of an overshoot and an undershoot of the voltage levels, the method comprising the acts of:

transmitting signals using at least one data-transmitting subscriber to check an operability of the data-transmitting subscribers;

checking a deviation of a voltage level of received signals from a desired signal voltage level during a normal transmission of data; and storing a value referring to the deviation voltage level of the received signals, referenced to individual data-transmitting subscribers, in at least one status map; and deciding that the reference-earth potential of a subscriber is displaced, when the value referring to the deviation voltage level exceeds a threshold.

8. The method according to claim 7, further comprising the act of:

holding, at least temporarily, status data characterizing at least one earlier system status and status data characterizing the current system status in the at least one status map.

9. Method for testing and safeguarding the availability of a databus system assigned to a system carrier, in which a multiplicity of subscribers exchange data via a bus-type network comprising one or more lines, at least individual subscribers transmitting data via the line or the lines by virtue of the fact that specific voltage levels are applied to the line or the lines by the appropriate subscribers, and the data being evaluated in at least one receiving subscriber with the aid of voltage levels by virtue of the fact that based on a signal criterion the line or the lines is or are monitored by the at least one receiving subscriber for the overshooting or undershooting of voltage levels, characterized in that during operation of the system signals present on the bus-type network (BUS_H, BUS_L) are discriminated or tested or measured with respect to at least said one signal criterion by individual subscribers under conditions defined in a network-wide fashion for all subscribers (ECU1 to ECU8), characteristic status data being generated in each case for each signal criterion with respect to each subscriber and being collected and arranged in at least one status map (SMP) of the system, these status data characterizing both the current status and at least one earlier status with regard to the tested subscribers (ECU1 to ECU8) with respect to the at least one criterion, and in that at least one measure of the degree of error of the databus system with respect to the at least one criterion is obtained from these status data.

10. Method for testing and safeguarding the availability of a databus system assigned to a system carrier, subscribers of this network exchanging data via one or more lines, at least individual subscribers transmitting data via the line or the lines by virtue of the fact that specific voltage levels are applied to the line or the lines by the appropriate subscribers, and the data being evaluated by at least one subscriber with the aid of voltage levels by virtue of the fact that the line or the lines is or are monitored by the at least one subscriber for the overshooting or undershooting of voltage levels, characterized in that the operability of data-receiving subscribers (ECU) is checked by virtue of the fact that signals are transmitted at a voltage level which is displaced by comparison with the normal transmission of data and, furthermore, it is checked at which measure of the displacement ($U_S$) of this voltage level at least individual subscribers can no longer receive data and in that at least one status map (SMP) is drawn up in which it is stored (B)—with reference to the individual data-receiving subscribers—in the form of status data at which displacement ($U_S$) of said voltage level at least individual subscribers can no longer receive data and/or at which (further) displacement of said voltage level which subscriber or subscribers can, as a last one or ones, still receive data.

11. Method for testing and safeguarding the availability of a networked system assigned to a system carrier, subscribers of this network exchanging data via one or more lines, at least individual subscribers transmitting data via the line or the lines by virtue of the fact that specific voltage levels are applied to the line or the lines by the appropriate subscribers, and the data being evaluated by at least one subscriber with the aid of voltage levels by virtue of the fact that the line or the lines is or are monitored by the at least one subscriber for the overshooting or undershooting of voltage levels, characterized in that the operability of data-transmitting subscribers (ECU; ECU1 to ECU8) is checked by virtue of the fact that signals are transmitted by at least one data-transmitting subscriber and, furthermore, it is checked to what extent the level of the received signals deviates from the desired value ("N") of the signal level in the case of normal transmission of data, and in that at least one status map (SMP) is drawn up in which a measure of the deviation determined is stored with reference to the individual data-transmitting subscribers.

\* \* \* \* \*